(12) United States Patent
Fukuma et al.

(10) Patent No.: US 9,396,627 B2
(45) Date of Patent: Jul. 19, 2016

(54) INFORMATION PROCESSING DEVICE AND METHOD

(71) Applicant: Sony Corporation, Tokyo (JP)

(72) Inventors: Yohei Fukuma, Chiba (JP); Takeshi Oka, Kanagawa (JP); Kazunori Hamada, Tokyo (JP); Kenji Kawaguchi, Fukushima (JP); Hidetoshi Kawauchi, Kanagawa (JP); Yoshihiro Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 34 days.

(21) Appl. No.: 14/355,718

(22) PCT Filed: Nov. 8, 2012

(86) PCT No.: PCT/JP2012/078916
§ 371 (c)(1),
(2) Date: May 1, 2014

(87) PCT Pub. No.: WO2013/073437
PCT Pub. Date: May 23, 2013

(65) Prior Publication Data
US 2014/0247132 A1    Sep. 4, 2014

(30) Foreign Application Priority Data

Nov. 15, 2011    (JP) ................................ 2011-249510

(51) Int. Cl.
*G08B 5/22*        (2006.01)
*G08B 5/36*        (2006.01)
(Continued)

(52) U.S. Cl.
CPC    *G08B 5/36* (2013.01); *G06F 3/014* (2013.01); *G09G 3/14* (2013.01); *G09G 5/00* (2013.01); *H05B 33/0857* (2013.01); *H05B 37/029* (2013.01)

(58) Field of Classification Search
CPC ....... G09F 9/33; G09F 21/04; F21Y 2101/02; B60Q 1/2611; B60Q 1/2696
USPC ............... 340/815.4, 815.45, 815.48, 815.56, 340/815.59, 815.6, 815.65, 815.66, 815.67
See application file for complete search history.

(56) References Cited

U.S. PATENT DOCUMENTS

2004/0243324 A1*    12/2004    Nunokawa ............ G06F 1/1626
                                                            702/63
2009/0251407 A1    10/2009    Flake et al.
(Continued)

FOREIGN PATENT DOCUMENTS

| CN | 1545692 A | 11/2004 |
|---|---|---|
| JP | 2002-280189 | 9/2002 |

(Continued)

OTHER PUBLICATIONS

Japanese Office Action issued on Sep. 15, 2015 in patent application No. 2013544230.
(Continued)

*Primary Examiner* — George Bugg
*Assistant Examiner* — Anthony D Afrifa-Kyei
(74) *Attorney, Agent, or Firm* — Chip Law Group

(57) ABSTRACT

The present technique relates to an information processing device and an information processing method that can realize new forms of communication tools.
LEDs emit light in accordance with a light emission pattern specified by a combination of light emission parameters that represent light emission characteristics. A light emission control unit performs control to select a light emission pattern from among two or more preset light emission patterns, based on a change in physical quantity resulting from an action of a user, and cause a light-emitting unit to emit light in accordance with the selected light emission pattern. The present technique can be applied to information processing devices used as communication tools.

13 Claims, 12 Drawing Sheets

(51) Int. Cl.
*G09G 3/14* (2006.01)
*G09G 5/00* (2006.01)
*G06F 3/01* (2006.01)
*H05B 33/08* (2006.01)
*H05B 37/02* (2006.01)

(56) References Cited

U.S. PATENT DOCUMENTS

2012/0314546 A1* 12/2012 Brewer .............. G04G 17/04 368/281
2014/0073486 A1* 3/2014 Ahmed ............ A61B 5/02405 482/9

FOREIGN PATENT DOCUMENTS

JP 2003-060745 2/2003
JP 2007-221355 8/2007

OTHER PUBLICATIONS

Yasue Kishino et.al, Realizing Accessories Using LEDs with Remote Control, IPSJ SIG Technical Reports, Japan, Information Processing Society of Japan, May 13, 2004, vol. 2004, No. 44, pp. 65-70.

Office Action Received for Chinese Patent Application No. 201280054912.6, Mailed on March 23, 2016, 17 pages of Office Action Including 10 pages of English Translation.

* cited by examiner

INFORMATION PROCESSING DEVICE AND METHOD

TECHNICAL FIELD

The present technique relates to an information processing device and an information processing method, and more particularly, to an information processing device and an information processing method that can realize new forms of communication tools.

BACKGROUND ART

Since time immemorial, people have lived with others side by side. Thus, communication is indispensable for humankind. That is, it is no exaggeration to say that the history of humankind is the history of communication. Communication tools have been changing with the times.

Communication tools had previously been used in long-distance communication that cannot be made face-to-face. Specifically, in the distant past, beacons and the like were used as a communication tool. Thereafter, wire telephones and the like appeared. In recent years with technologies advanced, wireless cellular phones and the like have been used.

In addition, also in a short distance in which a face-to-face meeting is possible, in order to make communication other than verbal one, cellular phones with an infrared function have come to be used as a communication tool (see Patent Document 1, for example). That is, a user of a cellular phone performs infrared communication by bringing the cellular phone close to a cellular phone of another person, thereby being able to make communication with the other person such as exchanging information like e-mail addresses with the other person.

CITATION LIST

Patent Document

Patent Document 1: JP 2007-221355 A

SUMMARY OF THE INVENTION

Problems to be Solved by the Invention

However, in a conventional communication tool like a cellular phone described in Patent Document 1, communication is only aimed at exchanging information. On the other hand, when two or more persons communicate face-to-face without using communication tools, they have not only a purpose of exchanging information but also various purposes such as feeling a sense of unity with another person.

Thus, in recent years, there have been demands for the appearance of a new form of communication tool that allows communication not only for the purpose of exchanging information but also for various purposes such as feeling a sense of unity with another person.

Additionally, for a purpose such as feeling a sense of unity with another person, an unnecessarily difficult operation or a requirement for an operation unfit for the purpose prevents achieving the purpose. Therefore, there have been demands for the appearance of a new form of communication tool that allows communication for various purposes such as feeling a sense of unity with another person by a simple and intuitive operation.

The present technique has been made in view of this situation, and allows a new form of communication tool to be realized.

Solutions to Problems

An information processing device according to an aspect of the present technique includes: a light-emitting unit that emits light in accordance with a light emission pattern specified by a combination of light emission parameters that represent light emission characteristics; and a light emission control unit that performs control to select a light emission pattern from among two or more preset light emission patterns, based on a change in physical quantity resulting from an action of a user, and cause the light-emitting unit to emit light in accordance with the selected light emission pattern.

A communication control unit that controls wireless communication with another information processing device is further included. The light emission control unit can perform control to select a light emission pattern from among the two or more preset light emission patterns, based on the change in physical quantity and a signal received by the communication control unit.

A vibration unit that vibrates in accordance with a vibration pattern specified by a combination of vibration parameters that represent vibration characteristics, and a vibration control unit that performs control to select a light emission pattern from among two or more preset vibration patterns, based on the change in physical quantity, and cause the vibration unit to vibrate in accordance with the selected vibration pattern can be further provided.

A sensor unit that detects a change in physical quantity resulting from an action of a user is further included. The light emission control unit can estimate the kind of action taken by the user to communicate with another person, based on a change in physical quantity detected by the sensor unit, and select a light emission pattern in accordance with the estimated kind of action.

The sensor unit includes an acceleration sensor for detecting a change in acceleration resulting from an action of the user. The light emission control unit can estimate the kind of action taken by the user to communicate with another person, based on a change in acceleration detected by the acceleration sensor, and select a light emission pattern in accordance with the kind of action.

When the acceleration sensor detects acceleration greater than or equal to a predetermined threshold value, the light emission control unit can estimate that the kind of action taken by the user to communicate with another person is a first kind of action of colliding the information processing device, or a second kind of action of continuously shaking the information processing device, and select a light emission pattern in accordance with the first kind or the second kind estimated.

The light emission control unit, when having estimated the first kind while causing the light-emitting unit to emit light in a first emission color, can select a first light emission pattern specifying a change from the first emission color to a second emission color of the other information processing device and a return to the first emission color over a first period of time.

The light emission control unit, when having estimated the second kind while causing the light-emitting unit to emit light in the first emission color, can select a second light emission pattern specifying a change from the first emission color to the second emission color and a return to the first emission color over a second period of time that is longer than the first period of time.

When the acceleration sensor detects acceleration greater than or equal to the predetermined threshold value, the communication control unit can control wireless communication used for information exchange between another information processing device within a predetermined distance and the information processing device.

The information processing device has a ring-shaped part to be fitted on the user's arm, and the part can be provided with a connection for disconnecting or connecting a portion thereof.

The connection can have a magnet and a magnet-attracted metal sheet for connecting the portion of the part.

The connection can connect the portion of the part by elastic deformation of the material.

An information processing method according to an aspect of the present technique is a method corresponding to the information processing device according to the above-described aspect of the present technique.

In the information processing device and method according to an aspect of the present technique, light is emitted in accordance with a light emission pattern specified by a combination of light emission parameters representing light emission characteristics, and control is performed so that, based on a change in physical quantity resulting from an action of a user, a light emission pattern is selected from among two or more preset light emission patterns, and light is emitted in accordance with the selected light emission pattern.

Effects of the Invention

As above, according to the present technique, a new form of communication tool can be realized.

MODES FOR CARRYING OUT THE INVENTION

[Outline of the Present Technique]

First, in order to facilitate the understanding of the present technique, an outline of the present technique will be given.

An information processing device to which the present technique is applied is a ring-shaped device (hereinafter, abbreviated to ring) that includes various kinds of sensors, a wireless module, light-emitting elements, and a vibrator, and has a diameter suitable for wearing on a user's arm, such as a wristband or a bracelet, and is wore on a user's arm. The basic functions of the ring are light emission and vibration. The light emission and vibration have a large (virtually infinite) number of patterns, which can be selectively switched in accordance with various information such as information obtained by a built-in sensor, and information obtained in the form of communication from outside.

A user, just by wearing such a ring on his or her arm, can have new communication that has not existed in the past with another user wearing a ring of the same kind on his or her arm, through the light emission and vibration of the rings.

Specifically, for example, a user can have communication with another user, such as exchanging information on each other, Social Network Service (SNS) accounts, for example, by shaking hands, or a high five, slapping each other's palms at a position higher than their faces. That is, the ring can realize easy and intuitive exchange of information between users.

Further, for example, a user can have communication with another user, such as simultaneously feeling physically the light emission and vibration of the rings in a pattern synchronized with the rhythm of a given music or the rate of heartbeats of a particular person, for example. That is, the ring can realize effective performance to allow users to get a sense of unity.

Like this, a ring to which the present technique has been applied can realize an entirely new form of communication tool that has not existed in the past. Hereinafter, description will be made of an embodiment of an information processing system including, as a component, such a ring to which the present technique has been applied, that is, an information processing system to which the present technique is applied.

[System Configuration Diagram]

Figure 1:
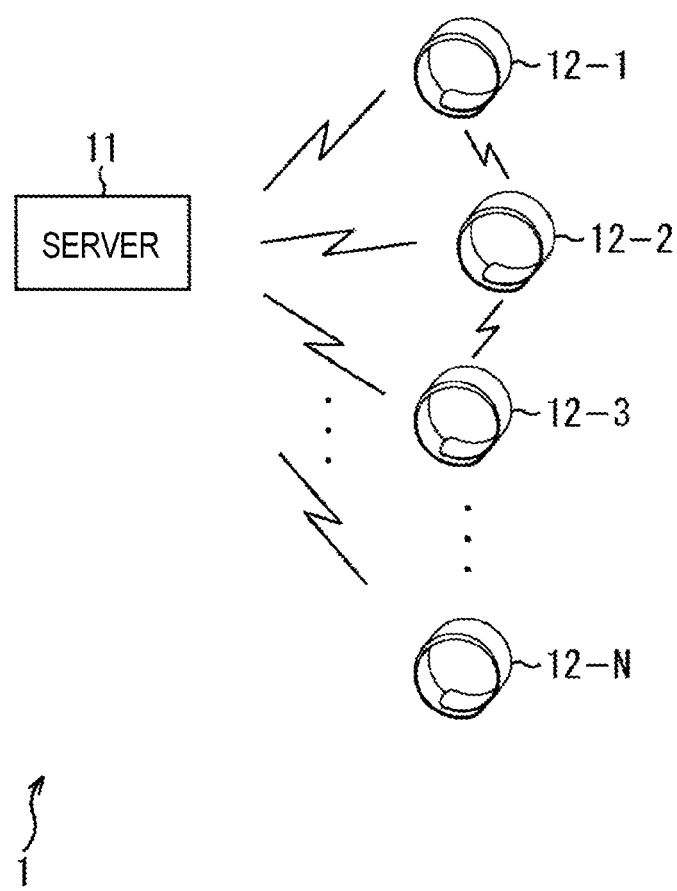
FIG. 1 is a configuration diagram of an information processing system to which the present technique is applied.
Figure 2:
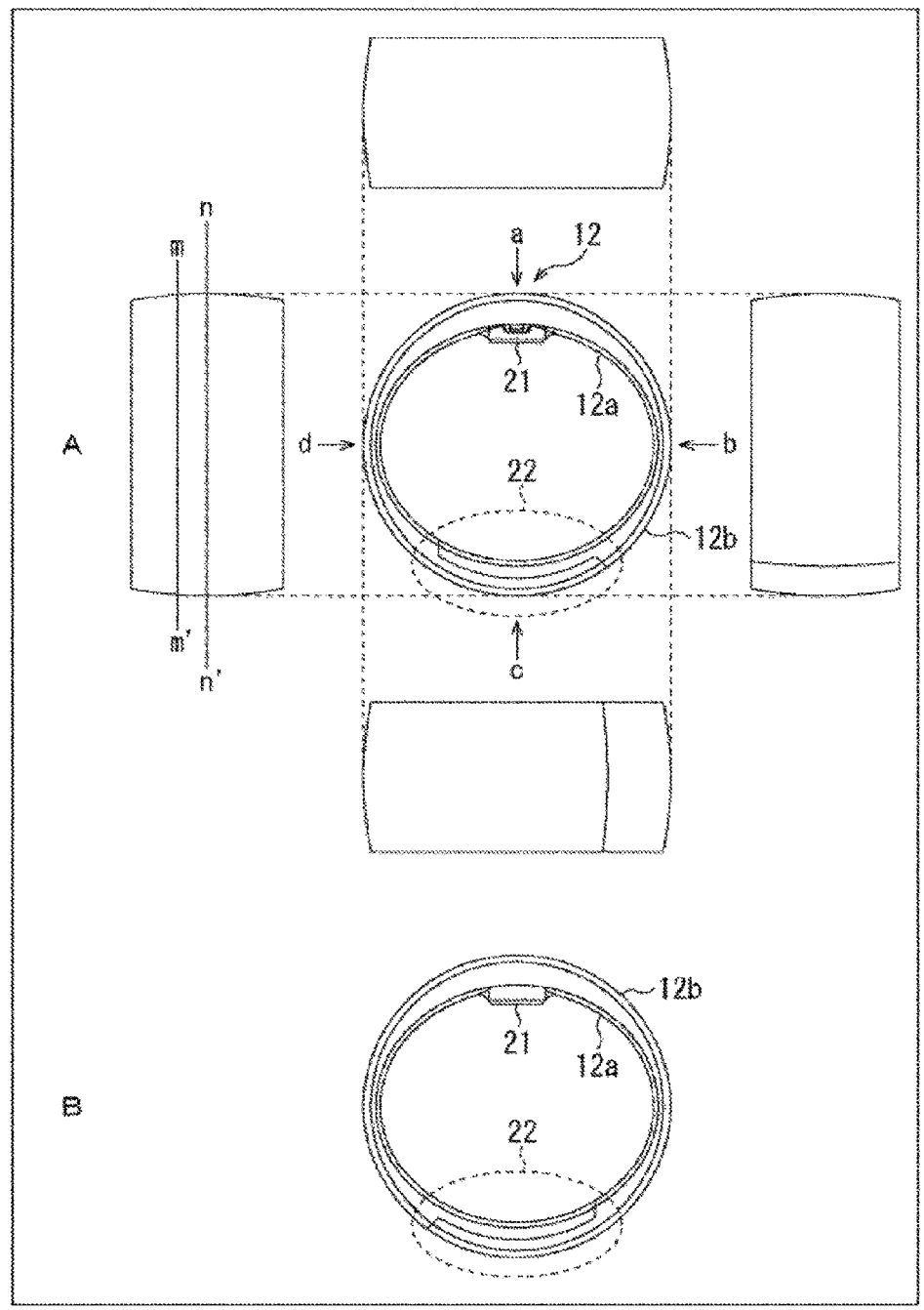
FIGS. 2A and 2B are diagrams showing the general configuration of a ring.
Figure 3:
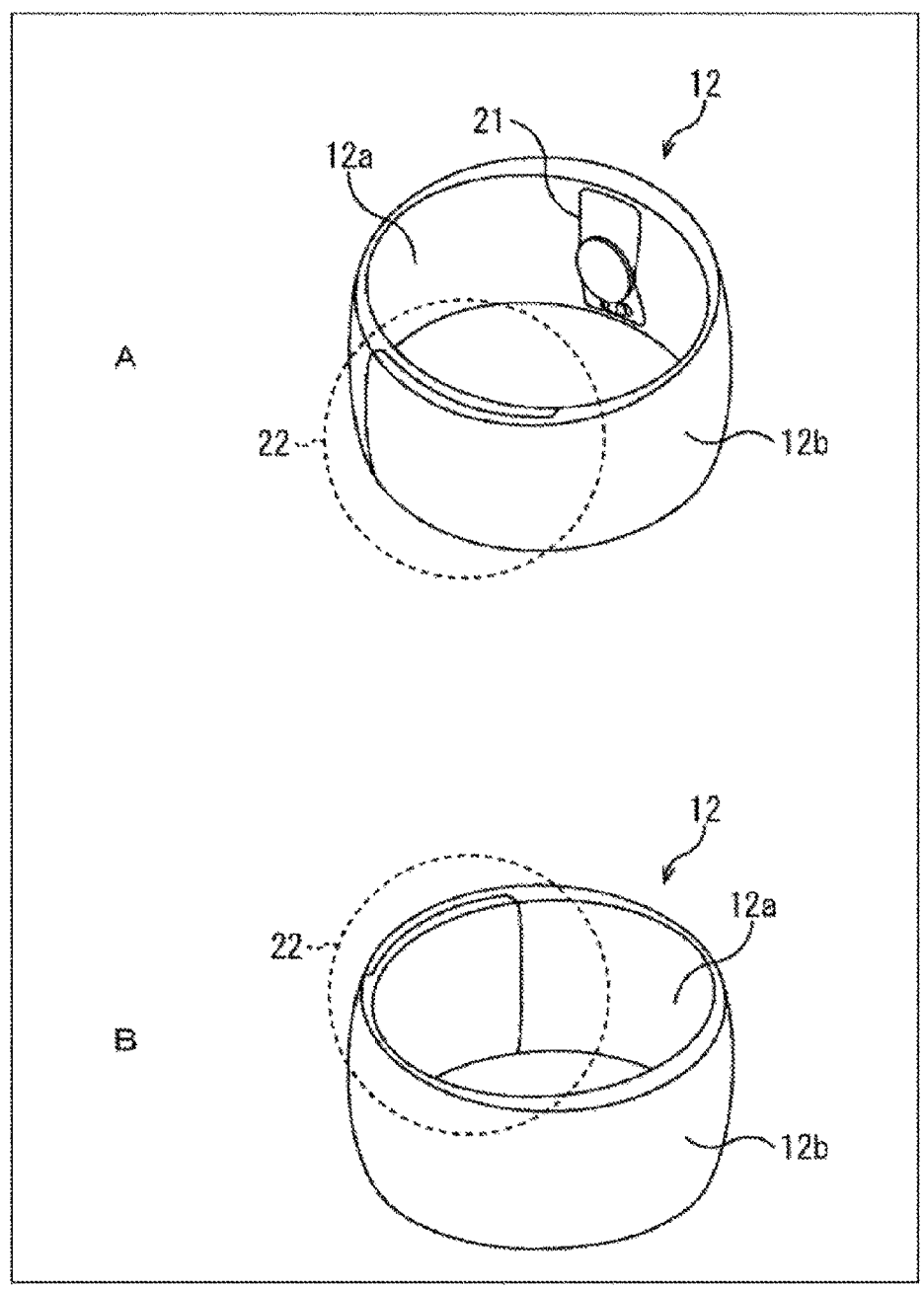
FIGS. 3A and 3B are perspective views of the ring.

FIG. 1 is a configuration diagram of an information processing system to which the present technique is applied.

An information processing system 1 includes a server 11 and rings 12-1 to 12-N (N is any integer more than one). Hereinafter, when the rings 12-1 to 12-N do not need to be individually identified, these are collectively referred to as the rings 12.

The server 11 relays various information transferred between the rings 12, and gives and receives various information to and from a given ring 12.

The rings 12 have the basic functions of light emission and vibration, and selectively switch the pattern of light emission and vibration based on various conditions. For example, the rings 12 emit light and vibrate in a predetermined pattern on condition that a predetermined signal is received from the server 11. Further, the rings 12 emit light and vibrate in a predetermined pattern on condition that a predetermined signal is exchanged with another ring 12 present within a predetermined range, for example, within a radius of 100 meters.

Moreover, the rings 12 have an information exchange function, and hold information to be exchanged, and send and receive such information to and from another ring 12 present within 30 centimeters, for example, by proximity communication.

Hereinafter, the configuration of this kind of ring 12 will be described with reference to FIGS. 2A to 6.

[General Configuration of the Ring]

FIGS. 2A and 2B are diagrams showing the general configuration of the ring 12 as an embodiment of the information processing device to which the present technique is applied. The central drawing in FIG. 2A is a front view of the ring 12. Here, the front is the side of the ring 12 when fitted on an arm and viewed from the side of the fingertips of the hand. The upper drawing in FIG. 2A is a top view of the ring 12 when the ring 12 is viewed in the direction of arrow a. The right drawing in FIG. 2A is a right side view of the ring 12 when the ring 12 is viewed in the direction of arrow b. The lower drawing in FIG. 2A is a bottom view of the ring 12 when the ring 12 is viewed in the direction of arrow c. The left drawing in FIG. 2A is a left side view of the ring 12 when the ring 12 is viewed in the direction of arrow d. FIG. 2B is a back view of the ring 12.

As shown in FIGS. 2A and 2B, a board 21 is embedded in an inner peripheral portion 12a of the ring 12 in a ring shape. Details will be described below with reference to FIG. 4. On the board 21, various kinds of sensors, a wireless module, light-emitting elements, a vibration mechanism, and other components are mounted. A connection 22 is provided in a position opposite to the board 21. Details will be described below. The connection 22 disconnects and connects the end portions of a circumferential portion constituting the side of the ring 12. That is, by disconnecting the end portions at the connection 22, a user can put his or her arm through or off the ring 12, and by connecting the end portions at the connection 22, can wear the ring 12.

When viewed from the front or the back, an outer peripheral portion 12b of the ring 12 is circular, while the inner peripheral portion 12a is oval. The outer peripheral portion 12b of the ring 12 is circular in order to uniformly guide light from the light emitting elements mounted on the board 21. The inner peripheral portion 12a of the ring 12 is oval in order to be in a shape conformed to the shape of a user's arm, thereby improving a feel of the ring 12 when fitted.

[Perspective View of the Ring]

FIGS. 3A and 3B are perspective views of the ring 12. FIG. 3A is a perspective view of the ring 12 from the direction from which the board 21 is visible. FIG. 3B is a perspective view of the ring 12 from the direction from which the connection 22 is visible.

[General Configuration of the Board]

FIGS. 4A to 4C are diagrams showing the general configuration of the board 21 mounted on the ring 12. The central drawing in FIG. 4A is a front view of the board 21. Here, the front is the side on which various kinds of sensors, a wireless module, light-emitting elements, a vibration mechanism, and other components are mounted. The upper drawing in FIG. 4A is a top view of the board 21 when the board 21 is viewed in the direction of arrow a. The right drawing in FIG. 4A is a right side view of the board 21 when the board 21 is viewed in the direction of arrow b. The lower drawing in FIG. 4A is a bottom view of the board 21 when the board 21 is viewed in the direction of arrow c. The left drawing in FIG. 4A is a left side view of the board 21 when the board 21 is viewed in the direction of arrow d. FIG. 4B is a back view of the board 21. FIG. 4C is a perspective view of the board 21.

As shown in FIG. 4A, on the front side of the board 21, a central processing unit (CPU) 31, a wireless module 32, a three-axis acceleration sensor 33, and light-emitting diodes (LEDs) 34 are mounted.

The CPU 31 executes various kinds of processing in accordance with programs or the like recorded in a built-in memory (a storage unit 86 in FIG. 7 described below). In the built-in memory, data and the like necessary for the CPU 31 to execute various kinds of processing are stored as appropriate.

The wireless module 32 gives and receives various kinds of information to and from the server 11 or another ring 12 by wireless communication.

The three-axis acceleration sensor 33 detects acceleration in three axis directions that are nearly orthogonal to each other, individually, and supplies sensor information showing the detection results to the CPU 31. Specifically, the three-axis acceleration sensor 33 detects a change in physical quantity resulting from an action of a user, that is, acceleration.

The LEDs 34 emit light in more than one pattern in accordance with the control of the CPU 31. A light emission pattern is specified by a combination of at least one kind of two or more kinds of light emission parameter. Here, light emission parameters refer to parameters representing characteristics of light emission. For example, there are various kinds thereof such as the intensity, the emission color, the light emission interval, and the light emission duration.

Not shown in the figures, the board 21 may be provided with a sensor for obtaining biological information such as a heartbeat sensor, a blood pressure sensor, or a body temperature sensor. Further, the board 21 may be provided with a sensor for obtaining environmental information such as a pressure sensor, a temperature sensor, a humidity sensor, a sound sensor, an image sensor, an ultraviolet sensor, or a radiation sensor.

As shown in FIG. 4B, on the back of the board 21, a vibration mechanism 35 is mounted. The vibration mechanism 35 vibrates in more than one pattern in accordance with the control of the CPU 31. A vibration pattern is specified by a combination of at least one kind of two or more kinds of vibration parameter. Here, vibration parameters refer to parameters representing characteristics of vibration. For example, there are various kinds thereof such as the number of times of vibration, the vibration interval, and the vibration duration.

The board 21 is made in a size to be able to be concealed behind a logo or a mark depicted on the surface of the ring 12, so that aesthetic appearance is not spoiled even when the body of the ring 12 is transparent or translucent.

[Cross-Section of the Ring]

FIGS. 5A and 5B are cross-sectional views of the ring 12. FIG. 5A is a cross-sectional view of the ring 12 along line m-m' in the left drawing of FIG. 2A. FIG. 5B is a cross-sectional view of the ring 12 along line n-n' in the left drawing of FIG. 2A.

As shown in FIG. 5A, the body 20 of the ring 12 has a two-layer structure with an inside light-guiding layer 41 and outside reflection layers and diffusion layers 42 between which the light-guiding layer 41 is held.

The light-guiding layer 41 guides light emitted from the LEDs 34 on the board 21 throughout the ring 12 like a fiber-optic cable.

The reflection layers and diffusion layers 42 reflect and diffuse light from the board 21 guided by the light-guiding layer 41 throughout the ring 12.

As shown in FIG. 5A, the LEDs 34 are arranged in axisymmetric positions without a shield. Light emitted from the LEDs 34 arranged like this is guided by the light-guiding layer 41 throughout the body 20 of the ring 12, and diffused by the reflection layers and diffusion layers 42 throughout the ring 12.

As shown in FIG. 5B, grooves 20a are formed at the inner side of the connection 22. At the bottoms of the grooves 20a, magnet-attracted metal sheets 43 (four in the example of FIGS. 5A and 5B) such as iron that is attracted to a magnet are provided. At the outer side of the connection 22 of the ring 12, magnets 44 that are smaller in number (two in the example of FIGS. 5A and 5B) than the magnet-attracted metal sheets 43 are provided in a size and a shape that fit in the grooves 20a provided at the inner side of the connection 22. At the connection 22, the magnets 44 are fitted into the grooves 20a provided with the magnet-attracted metal sheets 43 to be magnetically attached, thereby connecting the end portions of the circumferential portion of the ring 12.

The structure of the connection 22 like this allows the ring 12 to be fitted on arms of various sizes from a thin arm to a thick arm. Further, the connection 22 is not provided with a fastener or the like, and thus has a good feel when fitted for a user, and is easy to put on and take off. In addition, light from the LEDs 34 is guided and diffused without being obstructed. Moreover, although light intensities at the end portions of the ring 12 are weak, the end portions are overlapped at the connection 22, adding the light intensities, so that a user sees light uniformly guided at any point of the ring 12. Thus aesthetic appearance is improved.

As shown in FIG. 5B, the vibration mechanism 35 provided to the board 21 is provided to protrude from the inner peripheral portion of the ring 12. With this, the vibration mechanism 35 is brought into contact with a user's arm, so that vibration of the vibration mechanism 35 is easily transmitted to the user's arm.

As a material for the body 20 of the ring 12, a synthetic resin such as a polyurethane elastomer (RU-842A-CLR), for example, can be used. The inner side and the outer side of the connection 22 are both transparent or translucent, and at the outer side, 5%, for example, of a diffusion material for diffusing light is contained.

As a material for the magnet-attracted metal sheets 43, SUS430, for example, can be used. As a material for the magnets 44, neodymium, for example, can be used.

Not shown in the figures, the board 21 can be covered by a cover. As a material for the cover in this case, aluminum, for example, can be used. In addition, not shown in the figures, a spacer can be fitted between the cover and the vibration mechanism 35. As a material for the spacer, PET, for example, can be used.

[Different General Configuration of Ring]

Figure 6:
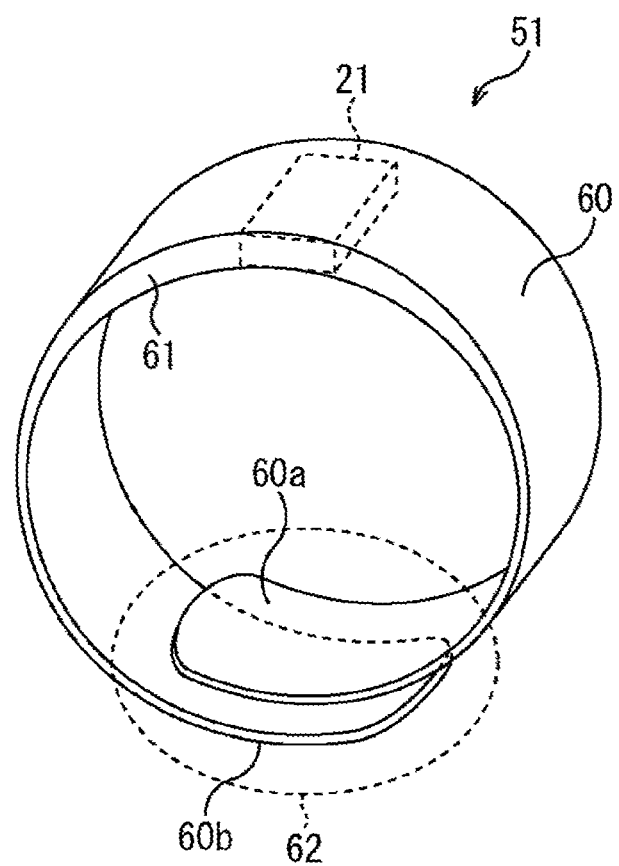
FIG. 6 is a diagram showing another general configuration of the ring.

FIG. 6 is a diagram showing the general configuration of a ring 51 configured differently from the ring 12.

The basic configuration of the ring 51 shown in FIG. 6 is the same as that of the ring 12. Thus, hereinafter, points of the ring 51 identical to those of the ring 12 will not be described, and only points of difference will be described.

While the ring 12 has the two-layer structure with the light-guiding layer 41 and the reflection layers and diffusion layers 42, the ring 51 has a one-layer structure only with a light-guiding layer 61.

While the connection 22 of the ring 12 is provided with the magnets 44 and the magnet-attracted metal sheets 43, a connection 62 of the ring 51 is not provided with anything. At the connection 62, an inside end portion 60a and an outside end portion 60b are processed to overlap in contact with each other when no force is applied to a body 60 of the ring 51. When the ring 51 is fitted on an arm, the body 60 is elastically deformed to enlarge the diameter of a circle formed by the body 60. When the body 60 is released from the force after the arm is put through the circle, the body 60 returns to the original position by its elastic force. As a material for the body 51, a polyurethane elastomer identical to that for the body 20 can be used.

This structure of the connection 62 allows the ring 51 to be fitted on arms of various sizes. Further, the connection 62 is not provided with a fastener or the like, and thus has a good feel for a user when fitted, and is easy to put on and take off. In addition, light from the LEDs 34 is guided without being obstructed. Moreover, although the light intensities at the end portions of the ring 51 are weak, the end portions are overlapped at the connection 62, adding the light intensities, so that a user sees light uniformly guided at any point of the ring 51. Thus aesthetic appearance is improved. Furthermore, since the connection 62 is not provided with magnet-attracted metal sheets 43, magnets 44, a fastener, or the like, manufacturing costs can be reduced.

The body 60 of the ring 51 may alternatively have a two-layer structure like the ring 12. Likewise, the body 20 of the ring 12 described above may alternatively have a one-layer structure like the body 60 of the ring 51.

[Functional Configuration Example of Board 21]

Figure 4:
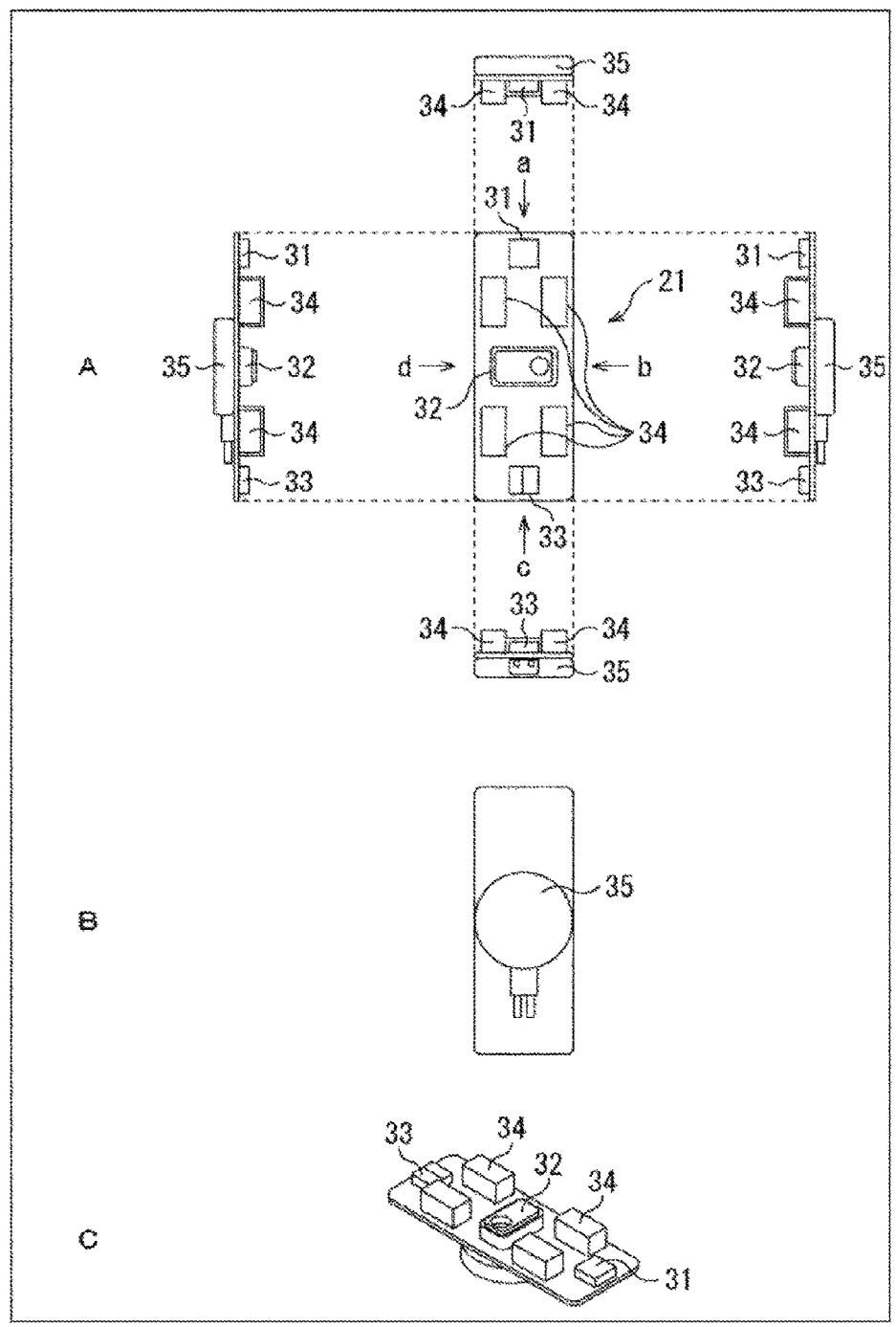
FIGS. 4A to 4C are diagrams showing the general configuration of a board.
Figure 5:
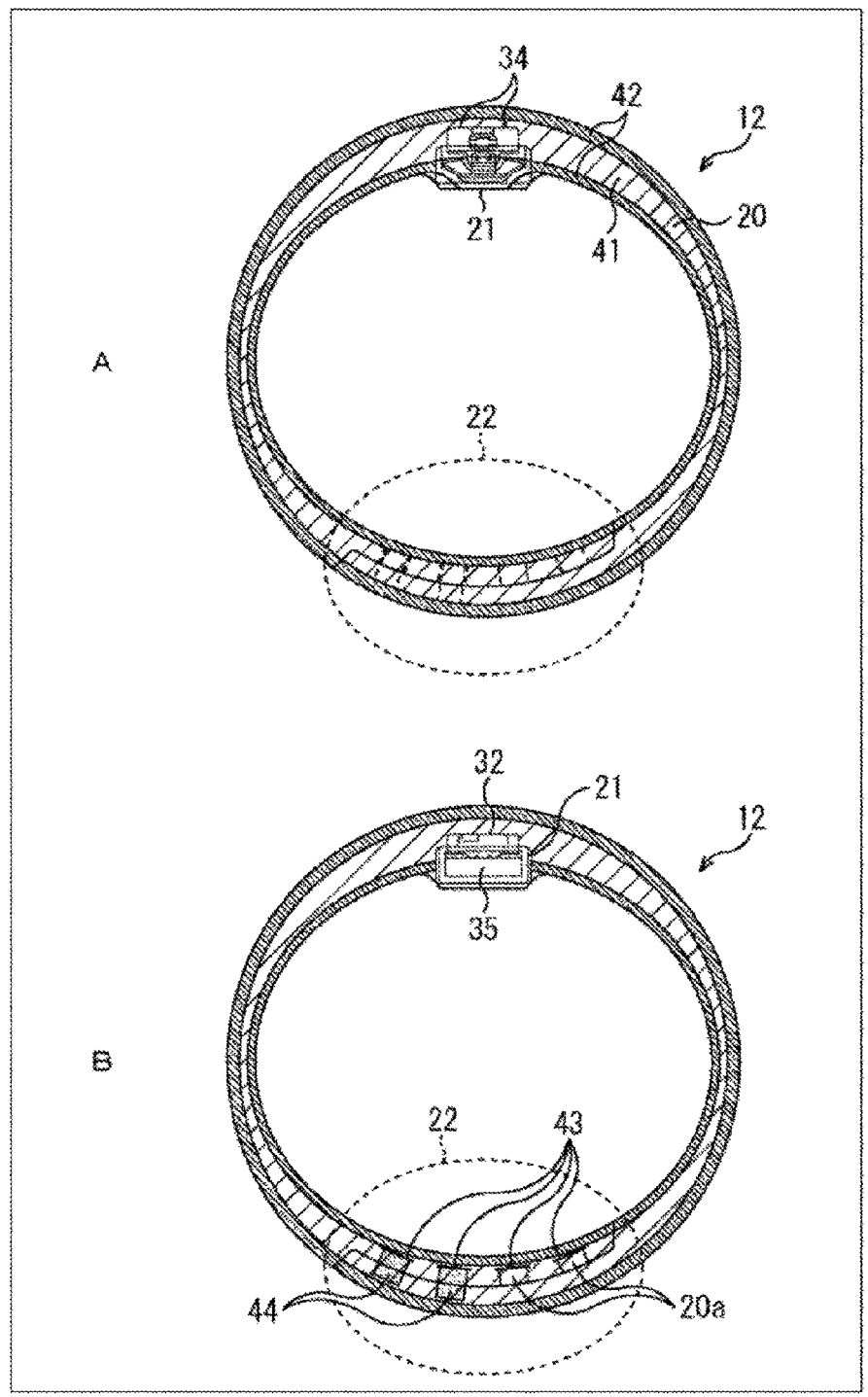
FIGS. 5A and 5B are cross-sectional views of the ring.
Figure 7:
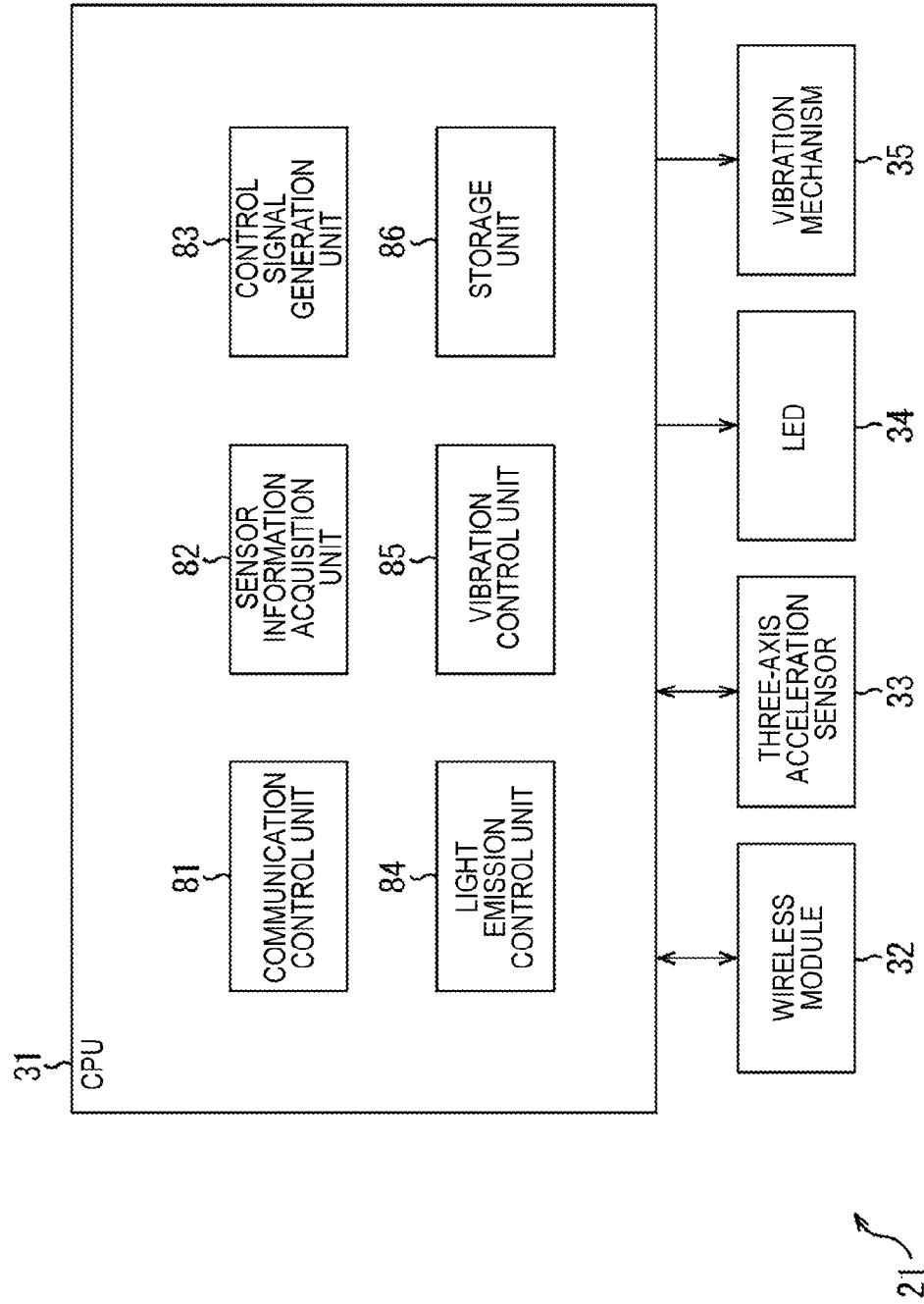
FIG. 7 is a functional block diagram showing the functional configuration of the board.

FIG. 7 is a functional block diagram showing the functional configuration of the board 21 in FIG. 4.

The board 21 is provided with the CPU 31, the wireless module 32, the three-axis acceleration sensor 33, the LEDs 34, and the vibration mechanism 35.

The wireless module 32, the three-axis acceleration sensor 33, the LEDs 34, and the vibration mechanism 35 have been described with reference to FIG. 4, and will not be described.

The CPU 31 functionally includes a communication control unit 81, a sensor information acquisition unit 82, a control signal generation unit 83, a light emission control unit 84, a vibration control unit 85, and a storage unit 86.

The communication control unit 81 executes predetermined authentication processing to authenticate a party (the server 11 or another ring 12) at the other end of wireless communication by the wireless module 32, and when authentication succeeds, controls wireless communication with the party. Also, the communication control unit 81 performs control as appropriate so that location information on the ring 12 is transmitted wirelessly from the wireless module 32 to the surroundings, and location information on another ring 12 within a predetermined distance is received by the wireless module 32.

The sensor information acquisition unit 82 acquires sensor information outputted from the three-axis acceleration sensor 33. Also, the sensor information acquisition unit 82 acquires sensor information outputted from various kinds of sensors not shown mounted on the board 21.

Based on sensor information acquired by the sensor information acquisition unit 82, the control signal generation unit 83 generates a control signal for controlling the light emission control unit 84 and the vibration control unit 85. Specifically, based on sensor information acquired by the sensor information acquisition unit 82, the control signal generation unit 83 estimates the kind of action taken by the user to communicate with another person, and generates a control signal in accordance with the estimated kind of action. Also, based on a signal received from the server 11 or another ring 12 through the control of the communication control unit 81, the control signal generation unit 83 generates a control signal for controlling the light emission control unit 84 and the vibration control unit 85. Control signals in this case correspond to various patterns of light emission and vibration. The various patterns are set in accordance with sensor information acquired or the kinds of signal received.

Based on a control signal generated by the control signal generation unit 83, the light emission control unit 84 selects one from among two or more preset light emission patterns, and performs control so that the LEDs 34 emit light in accordance with the selected light emission pattern.

Based on a control signal generated by the control signal generation unit 83, the vibration control unit 85 selects one from among two or more preset vibration patterns, and performs control so that the vibration mechanism 35 vibrates in accordance with the selected vibration pattern.

The storage unit 86 is constituted as a storage area provided within the CPU 31, and stores various kinds of information. For example, the storage unit 86 stores information on an SNS account of a user of the ring 12 or 51. Also, the storage unit 86 stores information on an SNS account of a user of another ring 12 or 51 received by proximity communication with the other ring 12 or 51. A ring 12 and a ring 51 can communicate with each other.

Light emission and vibration in more than one pattern by the ring 12 with this configuration will be described with reference to FIGS. 8 to 14. The following is the description of the ring 12, and is also applied to the ring 51 as a matter of course.

[State Transition Diagram]

Figure 8:
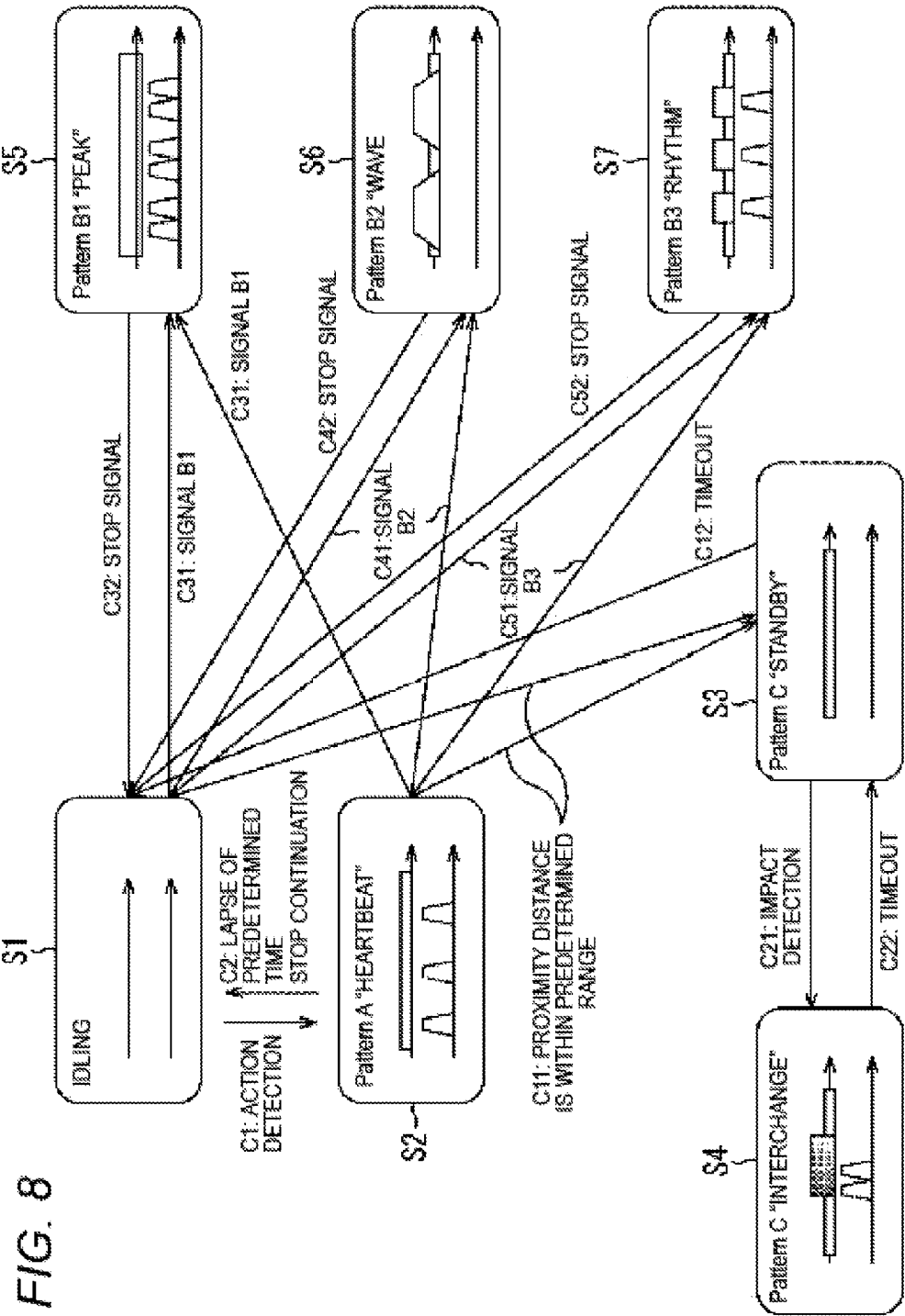
FIG. 8 is a state transition diagram showing an example of the states of operations that the ring can take when emitting light and vibrating.

FIG. 8 is a state transition diagram showing an example of the states of operations that the ring 12 can take when emitting light and vibrating.

In FIG. 8, each state is shown in a rounded rectangular box, and is identified by a reference numeral including "S" connected with a line to the box. A state transition from one state to another state (including the case of remaining in the same state) is performed when a predetermined condition (hereinafter, referred to as a state transition condition) is satisfied. The state transition conditions are represented by reference numerals including "C" attached to arrows that show transitions from one state to another state in FIG. 8.

Two axes shown in one box schematically show the states of light emission and vibration of the ring 12, individually. Specifically, the upper axis schematically shows the state of light emission of the LEDs 34, and the lower axis schematically shows the state of vibration of the vibration mechanism 35.

In this embodiment, a state S1 is a basic state, and is also referred to as an idling state S1. When the ring 12 is not fitted on the user's arm, or in a like situation, the three-axis acceleration sensor 33 does not detect an action. Also, when none of a signal B1, a signal B2, and a signal B3 described below is received by the ring 12, and no location information is received from another ring 12 within a predetermined distance, the idling state S1 is maintained as the operation state of the ring 12. In the idling state S1, as shown by the upper axis in the box, the light emission control unit 84 does not cause the LEDs 34 to emit light, and as shown by the lower axis in the box, the vibration control unit 85 does not cause the vibration mechanism 35 to vibrate.

When the user wears the ring 12 on his or her arm, for example, in the idling state S1, the three-axis acceleration sensor 33 detects the action. In such a case, the sensor information acquisition unit 82 acquires action detection information as sensor information, determines that detection of an action of a state transition condition C1 has been satisfied, and causes a transition of the operation state of the ring 12 to a state S2.

When a transition to the state S2 is made, in a pattern according to a control signal generated based on the sensor information, the light emission control unit 84 causes the LEDs 34 to emit light, and the vibration control unit 85 causes the vibration mechanism 35 to vibrate. The light emission and vibration pattern in accordance with a control signal generated based on sensor information like this is a pattern simulating a person's heartbeat, and thus hereinafter referred to as "pattern A 'heartbeat'."

In the state S2, the light emission control unit 84 causes the LEDs 34 to emit light with a certain low intensity (that is, low brightness) as shown by a waveform on the upper axis in the box, and the vibration control unit 85 causes the vibration mechanism 35 to vibrate in a certain rhythm as shown by a waveform on the lower axis in the box. Details of "pattern A 'heartbeat'" in the state S2 will be described with reference to FIG. 9.

[Details of Pattern A "Heartbeat"]

Figure 9:
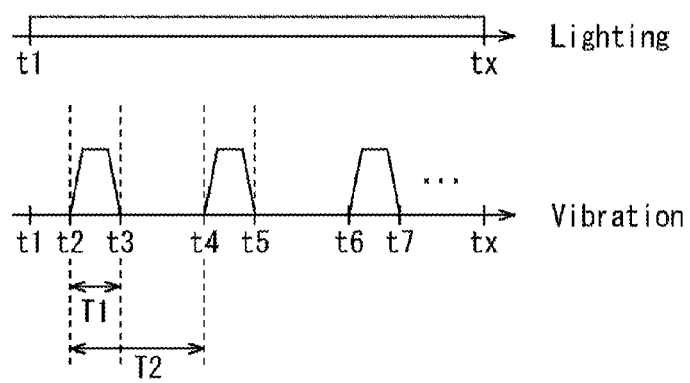
FIG. 9 is a diagram showing details of a state S2.
Figure 10:
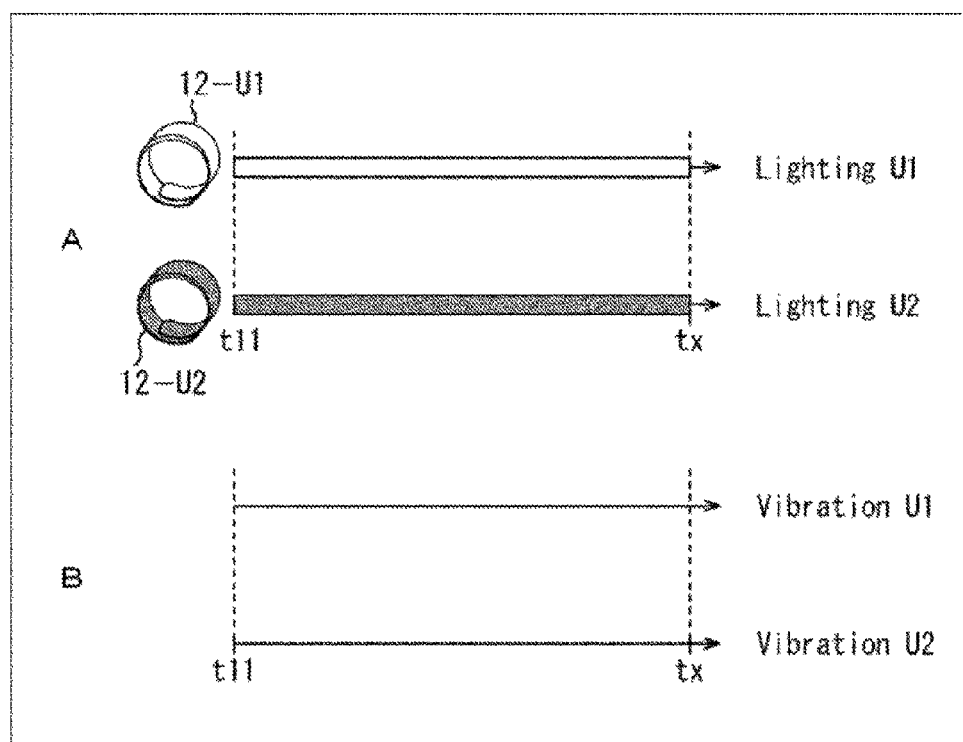
FIGS. 10A and 10B are diagrams showing details of a state S3.
Figure 11:
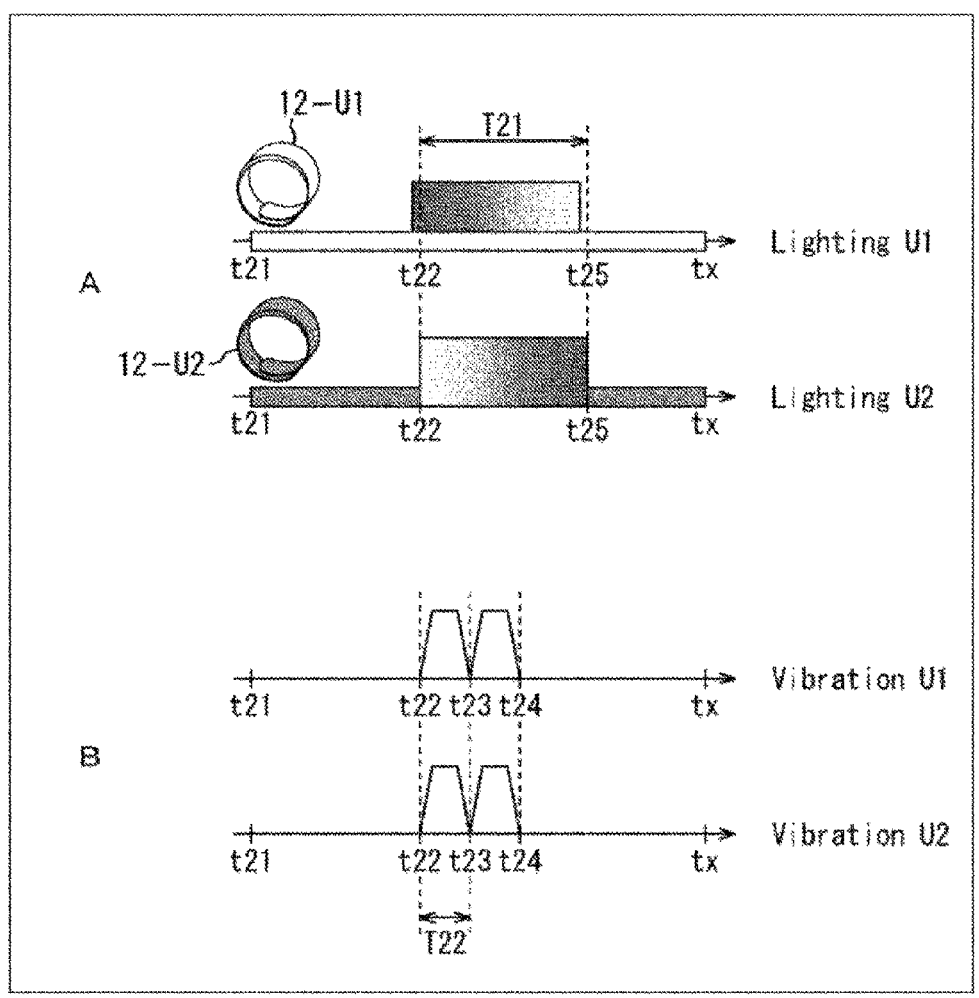
FIGS. 11A and 11B are diagrams showing details of a state S4.

FIG. 9 is a diagram showing details of "pattern A 'heartbeat'" in the state S2. In FIG. 9, a horizontal axis represents time, and a vertical axis represents the level of a waveform.

A waveform on the upper axis in FIG. 9 schematically shows, as indicated as "Lighting," the state of light emission of the LEDs 34. That is, the level of the waveform on the vertical axis represents the intensity of light. A waveform on the lower axis in FIG. 9 schematically shows, as indicated by "vibration," the state of vibration of the vibration mechanism 35. That is, the level of the waveform on the vertical axis represents the intensity of vibration.

When a transition to the state S2 is made, the light emission control unit 84 causes the LEDs 34 to emit light with the certain low intensity for a certain period from a start time t1 to a stop time tx. The period from the start time t1 to the stop time tx is five minutes, for example.

On the other hand, when a transition to the state S2 is made, the vibration control unit 85 causes the vibration mechanism 35 to vibrate in a pulse-like rhythm with a certain period. Hereinafter, the duration of a vibration is referred to as a vibration duration. The period of time from the start of a vibration to the start of the next vibration is referred to as a vibration interval.

Specifically, the vibration control unit 85 causes the vibration mechanism 35 to continue to vibrate for a vibration duration T1 from a time t2 to a time t3. Next, at a time t4 at which a vibration interval T2 has elapsed since the time t2, the vibration control unit 85 causes the vibration mechanism 35 to continue to vibrate for the vibration duration T1 from the time t4 to a time t5. At a time t6 at which the vibration interval T2 has elapsed since the time t4, the vibration control unit 85 causes the vibration mechanism 35 to continue to vibrate for the vibration duration T1 from the time t6 to a time t7. In this manner, with the vibration interval T2 as a period, the vibration mechanism 35 vibrates in a pulse-like rhythm with the vibration duration T1 as a pulse width. The vibration duration T1 is set at 0.5 second in this embodiment, but is not particularly limited. The vibration interval T2 is set at one second in this embodiment, but is not particularly limited.

In the state S2, when the three-axis acceleration sensor 33 does not detect an action for a predetermined time or more, the sensor information acquisition unit 82 determines that a state transition condition C2 of the lapse of the predetermined time has been satisfied, and causes a transition of the state of the ring 12 to the state S1. In this embodiment, as shown in FIG. 8, the predetermined time is set at three minutes.

When the wireless module 32 receives location information from another ring 12 within a predetermined distance with the state being the state S2, the communication control unit 81 determines that a state transition condition C11 that the proximity distance is within a predetermined range has been satisfied, and causes a transition of the state of the ring 12 to a state S3. The state S3 will be described below.

When the wireless module 32 receives any of the signal B1, the signal B2, and the signal B3 described below with the state being the state S2, the communication control unit 81 determines that one of state transition conditions C31, C41, and C51 that those signals have been received has been satisfied, and causes a transition of the state of the ring 12 to one of a state S5 (for the signal B1), S6 (for the signal B2), and S7 (for the signal B3). The states S5, S6, and S7 will be described below.

Not shown in the figure, also when the stop time tx of light emission of the LEDs 34 has elapsed in the state S2, the sensor information acquisition unit 82 causes a transition of the state of the ring 12 to the idling state S1. When a transition to the idling state S1 is made, the ring 12 stops light emission and vibration.

When the wireless module 32 receives a signal from another ring 12 within the predetermined distance in the idling state S1, the communication control unit 81 determines that the state transition condition C11 that the proximity distance is within the predetermined range has been satisfied, and causes a transition of the state of the ring 12 to the state S3. Another ring 12 within the predetermined distance means one of other rings 12 on which the above-described authentication has succeeded and the distance operated based on location information exchanged with each other after the authentication is within the predetermined distance.

When a transition to the state S3 is made, the light emission control unit 84 causes the LEDs 34 to emit light in a pattern in accordance with a control signal generated based on a signal from another ring 12. The vibration control unit 85 does not cause the vibration mechanism of the vibration mechanism 35 to vibrate. At this time, the sensor information acquisition unit 82 starts detailed tracking of sensor information outputted form the three-axis acceleration sensor. Thus, the light emission and vibration pattern in the state S3 in accordance with a control signal generated based on a signal from another ring 12 is a pattern showing a standby state before a transition to a state S4 described below is made, and thus hereinafter is referred to as "pattern C 'standby'."

In the state S3, the light emission control unit 84 causes the LEDs 34 to emit light with a certain low intensity as shown by a waveform on the upper axis in the box, and the vibration control unit 85 does not cause the vibration mechanism of the vibration mechanism 35 to vibrate as shown by the lower axis in the box. Details of "pattern C 'standby'" in the state S3 will be described with reference to FIGS. 10A and 10B.

[Details of Pattern C "Standby"]

FIGS. 10A and 10B are diagrams showing details of "pattern C 'standby'" in the state S3.

In FIGS. 10A and 10B, the states of light emission and vibration of a ring 12 (hereinafter, referred to as ring 12-U1) and another ring 12 (hereinafter, referred to as ring 12-U2) within the predetermined distance from the first ring 12 are schematically shown.

A waveform on an upper axis in FIG. 10A schematically shows the state of light emission of the LEDs 34 of the ring 12-U1 as indicated as "Lightning U1." A waveform on a lower axis in FIG. 10A schematically shows the state of light emission of the LEDs 34 of the ring 12-U2 as indicated as "Lightning U2." A waveform on an upper axis in FIG. 10B schematically shows the state of vibration of the vibration mechanism 35 of the ring 12-U1 as indicated by "vibration U1." A waveform on a lower axis in FIG. 10B schematically shows the state of vibration of the vibration mechanism 35 of the ring 12-U2 as indicated by "vibration U2."

When a transition to the state S3 is made, as shown in FIG. 10A, the light emission control unit 84 of the ring 12-U1 causes the LEDs 34 to emit light with the certain low intensity for a certain period from a start time t11 to a stop time tx. The light emission control unit 84 of the ring 12-U1 causes the LEDs 34 to emit light with the certain low intensity for a certain period from the start time t11 to the stop time tx. In FIG. 10A, to facilitate explanation, the ring 12-U1 emits light in a light color, and the ring 12-U2 emits light in a deep color.

On the other hand, when a transition to the state S3 is made, as shown in FIG. 10B, the vibration control units 85 of the ring 12-U1 and the ring 12-U2 both do not cause the vibration mechanisms of the vibration mechanisms 35 to vibrate.

In the state S3, when the three-axis acceleration sensor 33 outputs sensor information representing a sensor value, the sensor information acquisition unit 82 acquires the sensor information, and when detecting that the sensor value is greater than or equal to a threshold value, provides notification of the detection result as impact detection to the communication control unit 81. The communication control unit 81 wirelessly transmits the impact detection in the notification to the other ring 12 from the wireless module 32. This series of processing is executed in the other ring 12 in parallel at the same time. For example, when two users of the ring 12-U1 and the ring 12-U2 high-five each other, the impact is detected by the three-axis acceleration sensors 33, individually. Therefore, impact detection is also wirelessly transmitted to one ring 12 from the other ring 12. The communication control unit 81 causes the wireless module 32 to receive impact detection from the other ring 12. The control signal generation unit 83, when receiving impact detection from its own ring 12 acquired by the sensor information acquisition unit 82 and impact detection from the other ring 12 received through the control of the communication control unit 81, determines that a state transition condition C21 of impact detection has been satisfied, and causes a transition of the state of the ring 12 to the state S4.

When a transition to the state S4 is made, in a pattern according to a control signal generated based on sensor information on impact detection, the light emission control unit 84 causes the LEDs 34 to emit light, and the vibration control unit 85 causes the vibration mechanism 35 to vibrate. Further, immediately after the impact detection, the communication control unit 81 exchanges information with the other ring 12 by transmitting and receiving information on a user's SNS account to and from each other. Like this, the light emission and vibration pattern in accordance with a control signal generated based on sensor information is a pattern simulating an interchange by an information exchange between users, and thus is hereinafter referred to as "pattern C 'interchange'."

In the state S4, as shown by a waveform on the upper axis in the box, the light emission control unit 84 causes the LEDs 34 emitting light with the certain low intensity (in the state of the state S3) to emit light in a color of the ring 12 at the other end instantaneously at the detection of an impact, and then gradually return to the original color of the ring 12 over a predetermined period of time. As shown by a waveform on the lower axis in the box, the vibration control unit 85 causes the vibration mechanism 35 to vibrate more than one time at the detection of an impact. Details of "pattern C 'interchange'" in the state S4 will be described with reference to FIGS. 11A and 11B.

[Details of Pattern C "Interchange"]

FIGS. 11A and 11B are diagrams showing details of "pattern C 'interchange'" in the state S4.

In FIGS. 11A and 11B, the states of light emission and vibration of the ring 12-U1 and the ring 12-U2 as the other ring 12 are schematically shown.

A waveform on an upper axis in FIG. 11A schematically shows the state of light emission of the LEDs 34 of the ring 12-U1 as indicated as "Lightning U1." A waveform on a lower axis in FIG. 11A schematically shows the state of light emission of the LEDs 34 of the ring 12-U2 as indicated as "Lightning U2." A waveform on an upper axis in FIG. 11B schematically shows the state of vibration of the vibration mechanism 35 of the ring 12-U1 as indicated by "vibration U1." A waveform on a lower axis in FIG. 11B schematically shows the state of vibration of the vibration mechanism 35 of the ring 12-U2 as indicated by "vibration U2."

As shown in FIG. 11A, the LEDs 34 of the ring 12-U1 emit light in the light color with the certain low intensity in the state of the state S3 from a time t21 to a time t22 of impact detection. Likewise, the LEDs 34 of the ring 12-U2 emit light in the deep color with the certain low intensity in the state of the state S3 from the time t21 to the time t22 of impact detection. Because of the black and white expressions in the figures, the ring 12-U1 and the ring 12-U2 are distinguished by using the light color and the deep color, but do not need to be classified into the light color and the deep color, and may be any colors different from each other.

Then, when an impact is detected, a transition to the state of the state S4 is made, and the light emission control units 84 of the ring 12-U1 and the ring 12-U2 both cause the LEDs 34 to emit light in certain patterns of light intensities and colors. Hereinafter, a duration of light emission is referred to as a light emission duration.

Specifically, when an impact is detected at the time t22, the light emission control unit 84 of the ring 12-U1 causes the LEDs 34 to instantaneously change into a high intensity (that is, high brightness) to emit light in the emission color of the ring 12-U2 at the other end, that is, the deep color. Then, the light emission control unit 84 of the ring 12-U1 causes the LEDs 34 to emit light with the high intensity, gradually changing the emission color from the deep color to the light color as the emission color of the ring 12-U1 of its own during a light emission duration T21 from the time t22 to a time t25. Thereafter, during a period from the time t25 to a stop time tx, the LEDs 34 are caused to emit light in the light color with the certain low intensity. The light emission duration T21 is set at two seconds in this embodiment, but is not particularly limited.

Likewise, when an impact is detected at the time t22, the light emission control unit 84 of the ring 12-U2 causes the LEDs 34 to instantaneously change into a high intensity to emit light in the emission color of the ring 12-U1 at the other end, that is, the light color. Then, the light emission control unit 84 of the ring 12-U2 causes the LEDs 34 to emit light with the high intensity, gradually changing the emission color from the light color to the deep color as the emission color of the ring 12-U2 of its own during the light emission duration T21 from the time t22 to the time t25. Thereafter, during a period from the time t25 to the stop time tx, the LEDs 34 are caused to emit light in the deep color with the certain low intensity.

Like this, when an impact by a high five is detected, the LEDs 34 of the ring 12-U1 and the ring 12-U2 instantaneously change the emission colors with each other, and thereafter emit light, gradually returning to the colors of the rings 12 of their own.

Meanwhile, as shown in FIG. 11B, the vibration mechanisms 35 of the ring 12-U1 and the ring 12-U2 both do not vibrate from the time t21 to the time t22 of impact detection, being in the state of the state S3. When an impact is detected, a transition to the state of the state S4 is made, and the vibration control units 85 of the ring 12-U1 and the ring 12-U2 both cause the vibration mechanisms 35 to vibrate more than one time from the time t22.

Specifically, when an impact is detected at the time t22, the vibration control unit 85 of the ring 12-U1 causes the vibration mechanism 35 to continue to vibrate for a vibration duration T22 from the time t22 to a time t23. Then, the vibration control unit 85 of the ring 12-U1 causes the vibration mechanism 35 to continue to vibrate for the vibration duration T22 from the time t23 to a time t24. Thus, with the vibration duration T22 as a pulse width, the vibration mechanism 35 vibrates two or more times continuously from the vibration detection time. The vibration duration T22 is set at 0.2 second in this embodiment, but is not particularly limited. The number of vibrations is set at two in this embodiment, but is not particularly limited.

Likewise, when an impact is detected at the time t22, the vibration control unit 85 of the ring 12-U2 causes the vibration mechanism 35 to continue to vibrate for the vibration duration T22 from the time t22 to the time t23. Then, the vibration control unit 85 of the ring 12-U2 causes the vibration mechanism 35 to continue to vibrate for the vibration duration T22 from the time t23 to the time t24. Thus, with the vibration duration T22 as a pulse width, the vibration mechanism 35 vibrates two or more times continuously from the vibration detection time.

In this manner, when an impact by a high five is detected, the vibration control units 85 of the ring 12-U1 and the ring 12-U2 both cause the vibration mechanisms 35 to vibrate more than one time continuously.

Further, when an impact is detected in the state S4, the communication control unit 81 of the ring 12-U1 reads information on the SNS account of the user of the ring 12-U1 stored in the storage unit 86 for transmission to the ring 12-U2 by proximity communication by the wireless module 32. Then, since information on the SNS account of the user of the ring 12-U2 is transmitted from the ring 12-U2, the communication control unit 81 of the ring 12-U1 receives the SNS account information by proximity communication by the wireless module 32. The information on the SNS account of the user of the ring 12-U2 received in this manner is stored in the storage unit 86.

Likewise, when an impact is detected in the state S4, the communication control unit 81 of the ring 12-U2 reads information on the SNS account of the user of the ring 12-U2 stored in the storage unit 86 for transmission to the ring 12-U1 by proximity communication by the wireless module 32. Then, since information on the SNS account of the user of the ring 12-U1 is transmitted from the ring 12-U1, the communication control unit 81 of the ring 12-U2 receives the SNS account information by proximity communication by the wireless module 32. The information on the SNS account of the user of the ring 12-U1 received in this manner is stored in the storage unit 86.

Thus, when an impact is detected in the state S4, the ring 12-U1 and the ring 12-U2 exchange information on the SNS accounts of the users with each other by proximity communication, and store the information.

SNS account information stored in the storage unit 86 of the ring 12-U1 can be stored in another information processing device not shown. Consequently, for example, by accessing the SNS using the SNS account information, the user of the ring 12-U1 can know information such as the name and the e-mail address of the user of the other ring 12-U2.

Like this, by a simple method of high-fining the user of the other ring 12-U2, the user of the ring 12-U1 can easily exchange each other's information. Further, at the time of a high five, the emission colors of the LEDs 34 of the ring 12-U1 and the ring 12-U2 are instantaneously interchanged so that the users can intuitively understand the exchange of each other's information.

Moreover, after the emission colors of the LEDs 34 of the ring 12-U1 and the ring 12-U2 are interchanged, the LEDs 34 emit light, gradually returning to the colors of the rings 12 of their own, so that the users can check the degree of progress of the processing from the exchange of the information to the storage in the rings 12 of their own. With this, the users can obtain a sense of relief that the information has certainly been exchanged.

Further, the gradual changes of the emission colors of the LEDs 34 allow the users to enjoy the afterglow of information exchange. Moreover, by seeing the process of the color mixing with the color of the other ring 12, the user can get a sense of unity with the other user.

Although the light emission duration T21 is set at two seconds in the above-described example, when information is exchanged with a large number of other rings 12 for a short period of time, the light emission duration T21 may be further shortened.

In the above-described example, as a requirement for the exchange of information with each other between the rings 12 of the users, a requirement that the sensor values of the three-axis acceleration sensors 33 are made greater than or equal to a threshold value by an impact caused by an instantaneous collision between the rings 12 such as high-fining the rings 12 by the users is adopted, but this is not particularly limiting. For example, a requirement that the rings 12 repeat continuous shaking when the users shake hands with each other, thereby causing the sensor value of the three-axis acceleration sensors 33 to continuously become greater than or equal to the threshold value may alternatively be adopted.

When the sensor value of the three-axis acceleration sensor 33 becomes greater than or equal to the threshold value by an impact caused by a high five or the like, as a pattern of light emission and vibration of the ring 12, a pattern corresponding to the action of a high five is adopted. Specifically, a pattern in which, in synchronization with the action of a high five, the emission color of the LEDs 34 of the ring 12 instantaneously changes to the emission color of the other ring 12, and then gradually returns to the original emission color is adopted. Also, a pattern in which, in synchronization with the action of a high five, the vibration mechanism 35 of the ring 12 repeats short-time vibration a small number of times is adopted.

On the other hand, when the sensor value of the three-axis acceleration sensor 33 becomes greater than or equal to the threshold value by continuous shaking caused by shaking hands or the like, as a pattern of light emission and vibration of the ring 12, a pattern corresponding to the action of shaking hands is adopted. For example, a pattern in which, in accordance with the action of shaking hands, the emission color of the LEDs 34 of the ring 12 gradually changes into the emission color of the other ring 12, and then gradually returns to the original emission color over a certain period of time may alternatively be adopted. Also, a pattern in which, in accordance with the action of shaking hands, the vibration mechanism 35 of the ring 12 continues long-time vibration may alternatively be adopted.

Specifically, when the three-axis acceleration sensor 33 detects acceleration greater than or equal to the predetermined threshold, the control signal generation unit 83 estimates, from the change pattern, which one of the action of a high five and the action of shaking hands is the action taken by the user to communicate with another person, and generates a control signal in accordance with the estimated action.

Further, depending on the speed of shaking accompanying the action of shaking hands, the pattern of light emission and vibration of the ring 12 may be changed. For example, for a handshake accompanied by high-speed shaking, the time over which the emission color of the LEDs 34 of the ring 12 changes to the emission color of the other ring 12 is made a short time, and vibration of the vibration mechanism 35 is made to continue for a short time. On the other hand, for a handshake accompanied by low-speed shaking, the time during which the emission color of the LEDs 34 of the ring 12 changes to the emission color of the other ring 12 is made a long time, and vibration of the vibration mechanism 35 is made to continue for a long time.

Like this, the pattern of light emission and vibration of the ring 12 is a pattern corresponding to an action detected by the three-axis acceleration sensor 33, so that users can more intuitively exchange information between the users.

In the state S4, when impact detection as sensor information has not been obtained for a predetermined period of time or more, the sensor information acquisition unit 82 determines that a state transition condition C22 of a timeout has been satisfied, and causes a transition of the state of the ring 12 to the state S3.

In the state S3, when the wireless module 32 has not received impact detection from another ring 12 within the predetermined distance for a predetermined period of time or more, the communication control unit 81 determines that a state transition condition C12 of a timeout has been satisfied, and causes a transition of the state of the ring 12 to the idling state S1. When a transition to the idling state S1 is made, the ring 12 stops light emission and vibration.

When the wireless module 32 receives the signal B1 from the server 11 in the idling state S1, the communication control unit 81 determines that a state transition condition C31 of reception of the signal B1 has been satisfied, and causes a transition of the state of the ring 12 to the state S5. When the wireless module 32 receives the signal B2 from the server 11 in the idling state S1, the communication control unit 81 determines that a state transition condition C41 of reception of the signal B2 has been satisfied, and causes a transition of the state of the ring 12 to the state S6. When the wireless module 32 receives the signal B3 from the server 11 in the idling state S1, the communication control unit 81 determines that a state transition condition C51 of reception of the signal B3 has been satisfied, and causes a transition of the state of the ring 12 to the state S7.

The signals B1, B2, and B3 like these are individually transmitted from the server 11 and received by all the rings 12. The signals B1, B2, and B3 are, for example, signals for generating light emission and vibration patterns that are synchronized with the rhythm of a given music (for example, a fight song played in a stadium), the rate of heartbeats of a particular person (for example, a coach of a team they support), or others in the rings 12 individually. Alternatively, for example, the signals B1, B2, and B3 are signals for generating patterns of light emission and vibration specific to given groups (supporters of supporting teams) in the rings 12, separately. Patterns of light emission and vibration according to control signals generated based on the signals B1, B2, and B3 are not limited to the patterns described above. There are a large number (virtually an infinite number) of patterns. Thus, any number of given patterns are prepared in advance, and the server 11 selectively switches the patterns for transmission to the rings 12. In this embodiment, three patterns will be described.

[Details of Pattern B1 "Peak"]

First, the state S5 will be described. A transition to the state S5 is made, the light emission control unit 84 causes the LEDs 34 to emit light in a pattern according to a control signal generated based on the signal B1, and the vibration control unit 85 causes the vibration mechanism 35 to vibrate. Thus, the pattern of light emission and vibration according to the control signal generated base on the signal B1 is a pattern with high-intensity light emission and strong vibration, and thus hereinafter referred to as "pattern B1 'peak'."

In the state S5, as shown by a waveform on the upper axis in the box, the light emission control unit 84 causes the LEDs 34 to emit light with a certain high intensity, and as shown by a waveform on the lower axis in the box, the vibration control unit 85 causes the vibration mechanism 35 to vibrate in a certain rhythm. Details of "pattern B1 'peak'" in the state S5 will be described with reference to FIG. 12.

Figure 12:
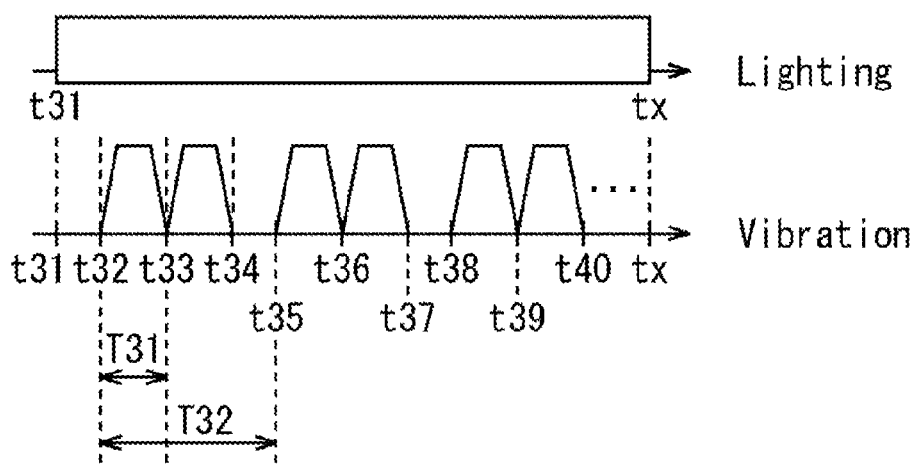
FIG. 12 is a diagram showing details of a state S5.

FIG. 12 is a diagram showing details of "pattern B1 'peak'" in the state S5.

A waveform on an upper axis in FIG. 12 schematically shows the state of light emission of the LEDs 34 as indicated as "Lighting." A waveform on a lower axis in FIG. 12 schematically shows the state of vibration of the vibration mechanism 35 as indicated by "vibration."

When a transition to the state S5 is made, the light emission control unit 84 causes the LEDs 34 to emit light with the certain high intensity for a certain period from a start time t31 to a stop time tx. The period from the start time t31 to the stop time tx corresponds to the length of a music or the like, for example.

Meanwhile, a transition to the state S5 is made, the vibration control unit 85 causes the vibration mechanism 35 to vibrate in a pulse-like rhythm with a certain period.

Specifically, the vibration control unit 85 causes the vibration mechanism 35 to continue to vibrate for a vibration duration T31 from a time t32 to a time t33. Then, the vibration control unit 85 causes the vibration mechanism 35 to continue to vibrate for the vibration duration T31 from the time t33 to a time t34. Next, at a time t35 at which a vibration interval T32 has elapsed since the time t32, the vibration control unit 85 causes the vibration mechanism 35 to continue to vibrate for the vibration duration T31 from the time t35 to a time t36. Then, the vibration control unit 85 causes the vibration mechanism 35 to continue to vibrate for the vibration duration T31 from the time t36 to a time t37. Next, at a time t38 at which the vibration interval T32 has elapsed since the time t35, the vibration control unit 85 causes the vibration mechanism 35 to continue to vibrate for the vibration duration T31 from the time t38 to a time t39. Then, the vibration control unit 85 causes the vibration mechanism 35 to continue to vibrate for the vibration duration T31 from time t39 to a time t40.

In this manner, with the vibration interval T32 as a period, the vibration mechanism 35 vibrates in a pulse-like rhythm with the vibration duration T31 as a pulse width. The vibration duration T31 is set at 0.4 second in this embodiment, but is not particularly limited. The vibration interval T32 is set at one second in this embodiment, but is not particularly limited. The vibration control unit 85, which causes the vibration mechanism 35 to vibrate in a pulse-like rhythm with a certain period, may alternatively cause the vibration mechanism 35 to vibrate continuously.

In the state S5, when a stop signal is received, the communication control unit 81 determines that a state transition condition C32 of reception of a stop signal has been satisfied, and causes a transition of the state of the ring 12 to the idling state S1. As a stop signal, a signal of a forced stop of an operation transmitted from the server 11, or an error signal for the case where the signal B1 has a defect, or the like is used in this embodiment. When a transition to the idling state S1 is made, the ring 12 stops light emission and vibration.

[Details of Pattern B2 "Wave"]

Next, the state S6 will be described. A transition to the state S6 is made, the light emission control unit 84 causes the LEDs to emit light in a pattern according to a control signal generated based on the signal B2, and the vibration control unit 85 does not cause the vibration mechanism 35 to vibrate. Like this, the light emission and vibration pattern in accordance with a control signal generated based on the signal B2 is a pattern simulating a wave with light emission in a pulse-like rhythm with a certain period and without vibration, and thus is hereinafter referred to as "pattern B2 'wave'."

In the state S6, as shown by a waveform on the upper axis in the box, the light emission control unit 84 causes the LEDs 34 to emit light with a strong intensity in a pulse-like rhythm with a certain period, and as shown by the lower axis in the box, the vibration control unit 85 does not cause the vibration mechanism 35 to vibrate. Details of "pattern B2 'wave'" in the state S6 will be described with reference to FIG. 13.

Figure 13:
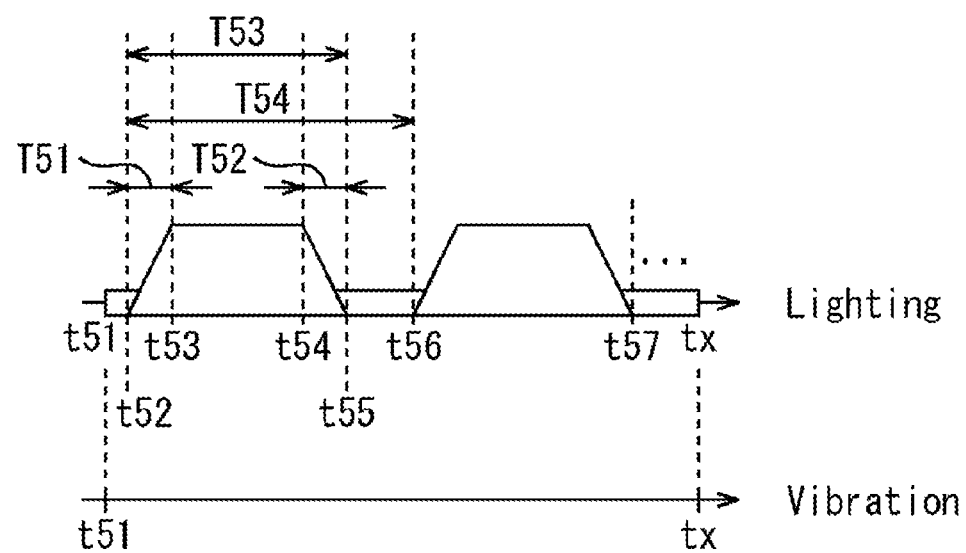
FIG. 13 is a diagram showing details of a state S6.

FIG. 13 is a diagram showing details of "pattern B2 'wave'" in the state S6.

A waveform on an upper axis in FIG. 13 schematically shows the state of light emission of the LEDs 34, as indicated as "Lighting." A waveform on a lower axis in FIG. 13 schematically shows the state of vibration of the vibration mechanism 35, as indicated by "vibration."

When a transition to the state S6 is made, the light emission control unit 84 causes the LEDs 34 to emit light in a pulse-like rhythm with a certain period from a start time t51 to a stop time tx. A period from the start time t51 to the stop time tx corresponds to the length of a music or the like, for example. Hereinafter, the period of time from the start of light emission to the start of the next light emission is referred to as a light emission interval. The period of time in which the intensity of the LEDs 34 increases from a low intensity to a high intensity is referred to as an emission rise time. The period of time in which the intensity of the LEDs 34 decreases from a high intensity to a low intensity is referred to as an emission fall time.

Specifically, the light emission control unit 84 causes the LEDs 34 to emit light with a certain low intensity from the start time t51 to a time t52. Then, the light emission control unit 84 causes the LEDs 34 to emit light, gradually increasing the intensity to a certain high intensity for the duration of an emission rise time T51 from the time t52 to a time t53. Then, the light emission control unit 84 causes the LEDs 34 to emit light with the certain high intensity from the time t53 to a time t54. Then, the light emission control unit 84 causes the LEDs 34 to emit light, gradually decreasing the intensity to the certain low intensity for the duration of an emission fall time T52 from the time t54 to a time t55. Thus, the light emission control unit 84 causes the LEDs 34 to emit light, changing the intensity in a certain pattern during a light emission duration T53 from the time t52 to the time t55. Then, from the time t55 to a time t56, the LEDs 34 are caused to emit light with the certain low intensity. Next, at the time t56 at which a light emission interval T54 has elapsed since the time t52, the light emission control unit 84 causes the LEDs 34 to emit light for the light emission duration T53 from the time t56 to a time t57, changing the intensity in the same pattern as that from the time t52 to the time t55.

On the other hand, when a transition to the state S6 is made, the vibration control unit 85 does not cause the vibration mechanism 35 to vibrate.

In this manner, with the light emission interval T54 as a period, the LEDs 34 emit light in a pulse-like rhythm with the light emission duration T53 as a pulse width. The emission rise time T51 and the emission fall time T52 are set at 0.5 second in this embodiment, but are not particularly limited. The light emission duration T53 is set at 1.5 seconds in this embodiment, but is not particularly limited. The light emission interval T54 is set at ten seconds in this embodiment, but is not particularly limited. The vibration control unit 85, which does not cause the vibration mechanism 35 to vibrate, may alternatively cause the vibration mechanism 35 to vibrate in a pattern associated with the light emission pattern of the LEDs 34. Specifically, vibration of the vibration mechanism 35 may be gradually strengthened in association with an increase in the intensity of the LEDs 34 for the duration of the emission rise time T51 of the LEDs 34. Also, vibration of the vibration mechanism 35 may be gradually weakened in association with a decrease in the intensity of the LEDs 34 for the duration of the emission fall time T52 of the LEDs 34.

In the state S6, when a stop signal is received, the communication control unit 81 determines that a state transition condition C42 of reception of a stop signal has been satisfied, and causes a transition of the state of the ring 12 to the idling state S1. As a stop signal, a signal of a forced stop of an operation transmitted from the server 11, or an error signal for the case where the signal B2 has a defect, or the like is used in this embodiment. When a transition to the idling state S1 is made, the ring 12 stops light emission and vibration.

[Details of Pattern B3 "Rhythm"]

Next, the state S7 will be described. When a transition to the state S7 is made, in a pattern according to a control signal generated based on the signal B3, the light emission control unit 84 causes the LEDs 34 to emit light, and the vibration control unit 85 causes the vibration mechanism 35 to vibrate. Thus, the light emission and vibration pattern in accordance with a control signal generated based on the signal B3 is a pattern with light emission in a pulse-like rhythm with a certain period and vibration in the same rhythm as that of light emission, and thus is hereinafter referred to as "pattern B3 'rhythm'."

In the state S7, as shown by a waveform on the upper axis in the box, the light emission control unit 84 causes the LEDs 34 to emit light with a high intensity in a pulse-like rhythm with a certain period, and as shown by the lower axis in the box, the vibration control unit 85 causes the vibration mechanism 35 to vibrate in the same rhythm as the rhythm in which the LEDs 34 emit light. Details of "pattern B3 'rhythm'" in the state S7 will be described with reference to FIG. 14.

Figure 14:
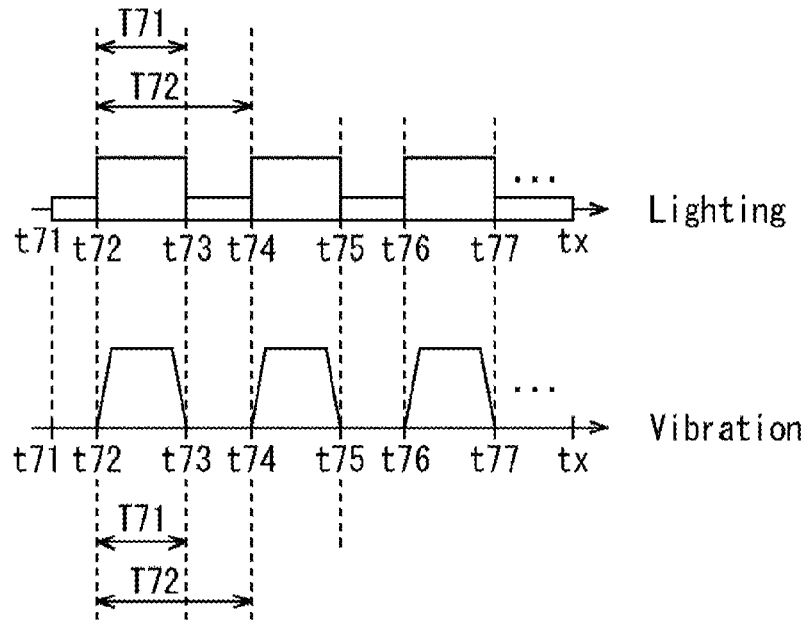
FIG. 14 is a diagram showing details of a state S7.

FIG. 14 is a diagram showing details of "pattern B3 'rhythm'" in the state S7.

A waveform on an upper axis in FIG. 14 schematically shows the state of light emission of LEDs 34, as indicated as "Lighting." A waveform on a lower axis in FIG. 14 schematically shows the state of vibration of the vibration mechanism 35, as indicated by "vibration."

When a transition to the state S7 is made, the light emission control unit 84 causes the LEDs 34 to emit light in a pulse-like rhythm with a certain period from a start time t71 to a stop time tx. The period from the start time t71 to the stop time tx corresponds to the length of a music or the like, for example.

Specifically, the light emission control unit 84 causes the LEDs 34 to emit light with a certain low intensity from the start time t71 to a time t72. Then, for a light emission duration T71 from the time t72 to a time t73, the light emission control unit 84 causes the LEDs 34 to emit light with the intensity of a certain high intensity. Then, from the time t73 to a time t74, the LEDs 34 are caused to emit light with the certain low intensity. Next, at the time t74 at which a light emission interval T72 has elapsed since the time t72, the light emission control unit 84 causes the LEDs 34 to emit light with the intensity of the certain high intensity for the light emission duration T71 from the time t74 to a time t75. Then, from the time t75 to a time t76, the LEDs 34 are caused to emit light with the certain low intensity. Next, at a time t76 at which the light emission interval T72 has elapsed since the time t74, the light emission control unit 84 causes the LEDs 34 to emit light with the intensity of the certain high intensity for the light emission duration T71 from the time t76 to a time t77. Thus, with the light emission interval T72 as a period, the LEDs 34 emit light in a pulse-like rhythm with the light emission duration T71 as a pulse width. The light emission duration T71 is set at 0.2 second in this embodiment, but is not particularly limited. The vibration interval T72 is set at 0.5 second in this embodiment, but is not particularly limited.

Meanwhile, when a transition to the state S7 is made, the vibration control unit 85 causes the vibration mechanism 35 to vibrate in a pulse-like rhythm with a certain period identical to that of the light emission of the LEDs 34 from the start time t71 to the stop time tx.

Specifically, the vibration control unit 85 causes the vibration mechanism 35 to continue to vibrate for a vibration duration T71 from the time t72 to the time t73. Next, at the time t74 at which a vibration interval T72 has elapsed since the time t72, the vibration control unit 85 causes the vibration mechanism 35 to continue to vibrate for the vibration duration T71 from the time t74 to the time t75. Next, at the time t76 at which the vibration interval T72 has elapsed since the time t74, the vibration control unit 85 causes the vibration mechanism 35 to continue to vibrate for the vibration duration T71 from the time t76 to the time t77. Thus, with the vibration interval T72 as a period, the vibration mechanism 35 vibrates in a pulse-like rhythm with the vibration duration T71 as a pulse width identical to that of the light emission of the LEDs 34. The vibration duration T71 is set at 0.2 second in this embodiment, but is not particularly limited. The vibration interval T72 is set at 0.5 second in this embodiment, but is not particularly limited.

In the state S7, when a stop signal is received, the communication control unit 81 determines that a state transition condition C52 of the reception of a stop signal has been satisfied, and causes a transition of the state of the ring 12 to the idling state S1. As a stop signal, a signal of a forced stop of an operation transmitted from the server 11, or an error signal for the case where the signal B3 has a defect, or the like is used in this embodiment. When a transition to the idling state S1 is made, the ring 12 stops light emission and vibration.

As the generation source of the signals B1, B2, and B3, the server 11 is used in the above-described example, but this is not particularly limiting. For example, the generation source of the signals B1, B2, and B3 may be sensor information of the three-axis acceleration sensor 33 of the ring 12. That is, a signal generated based on the sensor information may be used as at least one of the signals B1, B2, and B3.

For example, the generation source of the signals B1, B2, and B3 may be sensor information of a sensor obtaining an action, a heartbeat, a blood pressure, a body temperature, or the like of a user of the ring 12 (that is, biological information). That is, a signal generated based on the sensor information may be used as at least one of the signals B1, B2, and B3. In this case, for example, in response to a biological change in the user of the ring 12 who is taking exercise, the state of the ring 12 changes to the state S5, S6, or S7. Consequently, the user can intuitively perceive his or her physical condition, and can easily control his or her physical condition.

Alternatively, for example, the generation source of the signals B1, B2, and B3 may be sensor information of a sensor obtaining a temperature, a humidity, a sound, an image, or the like around the ring 12 (that is, environmental information). That is, a signal generated based on the sensor information may be used as at least one of the signals B1, B2, and B3. In this case, for example, in response to the environment of the ring 12, the state of the ring 12 changes to the state S5, S6, or S7. Consequently, the user can be intuitively aware of his or her environment, and can easily take various actions in response to the environment.

As a matter of course, two or more sensors may be combined, and a signal generated based on sensor information of each of the sensors may be used as at least one of the signals B1, B2, and B3.

When a signal generated based on sensor information of the ring 12 is used as the signals B1, B2, or B3, in the case where sensor information of various kinds of sensors cannot be obtained properly, or the like, a stop signal may be an error signal generated by the sensor information acquisition unit 82, for example.

Alternatively, as the signal B1, B2, or B3, a signal transmitted from another ring 12 within a predetermined distance may be used, for example.

For example, a signal generated based on sensor information obtained by the three-axis acceleration sensor 33 of another ring 12 in the predetermined distance and transmitted from the other ring 12 may be used as at least one of the signals B1, B2, and B3. In this case, for example, only when action information on the ring 12 becomes identical to that on the other ring 12, the state of the ring 12 changes to the state S5, S6, or S7. Alternatively, as action information on the ring 12 becomes similar to that on the other ring 12, the light emission and vibration of the ring 12 in the state S5, S6, or S7 become stronger. That is, the ring 12 emits light and vibrates only when the user acts the same as another user, or the light emission and vibration become stronger when the user's action is in agreement with that of another user. Consequently, for example, the user tries to take the same action as another user during a cheering dance or side by side running, and thus can get a sense of unity between the users.

[Applicability of the Present Technique]

As an information processing device to which the present technique is applied, the ring 12 has been described above, but an information processing device to which the present technique is applied is not particularly limited to the ring 12, and can take various embodiments to have the following configuration and to be able to execute the following processing, for example. In other words, an example of an information processing device that has the following configuration and can execute the following processing is the above-described ring 12.

Specifically, an information processing device to which the present technique is applied is configured to include a light-emitting unit, a sensor unit, a control signal generation unit, and an emission control unit. The light-emitting unit emits light in accordance with a light emission pattern specified by a combination of at least one kind of two or more kinds of light emission parameter such as the intensity, the emission color, the light emission interval, and the light emission duration. In the above-described ring 12, the LEDs 34 correspond to the light emission unit. The sensor unit detects a change in predetermined physical quantity. In the above-described ring 12, the three-axis acceleration sensor 33 corresponds to the sensor unit. The physical quantity detected by the sensor unit is not particularly limited to three-axis acceleration, and may be any kind of physical quantity that can be detected, and the number of kinds detected may be any. The control signal generation unit generates a control signal based on a detection result of the sensor unit. In the above-described ring 12, the control signal generation unit 83 in the CPU 31 corresponds to the control signal generation unit. The light emission control unit selects one from among two or more preset light emission patterns, based on a control signal generated by the control signal generation unit, and performs control to cause the light-emitting unit to emit light in accordance with the selected light emission pattern. In the above-described ring 12, the light emission control unit 84 in the CPU 31 corresponds to the light emission control unit.

[Light Emission Pattern Control Process]

Next, of the processes executed by the information processing device with this configuration, a process of controlling the pattern of light emission of the light-emitting unit (hereinafter, referred to as a light emission pattern control process) will be described.

Figure 15:
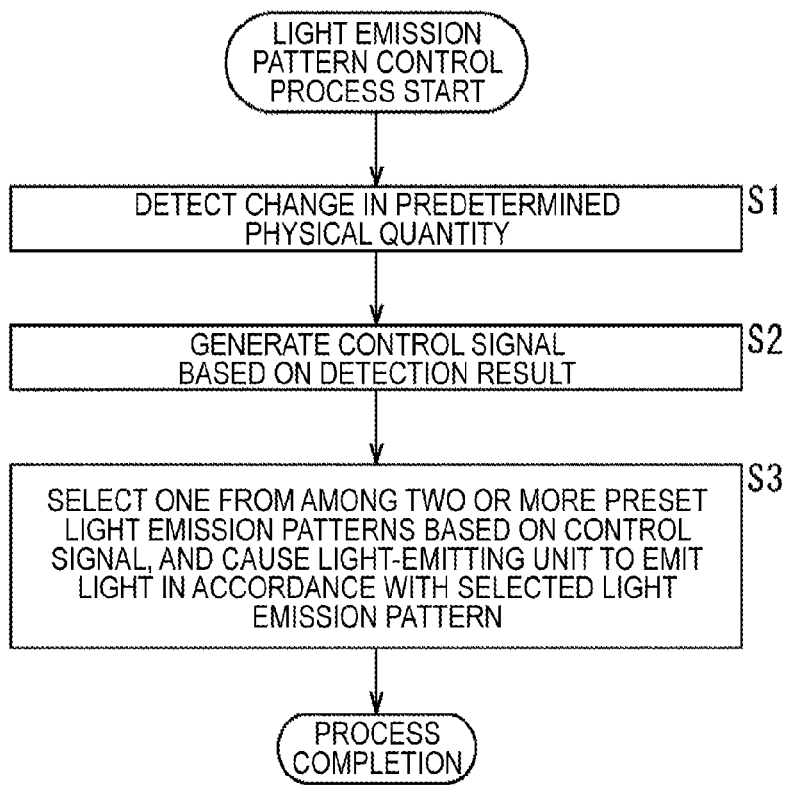
FIG. 15 is a flowchart illustrating the flow of a light emission pattern control process to be executed by an information processing device to which the present technique is applied.

FIG. 15 is a flowchart illustrating the flow of the light emission pattern control process executed by the information processing device to which the present technique is applied.

In step S1, the sensor unit detects a change in the predetermined physical quantity.

In step S2, the control signal generation unit generates a control signal based on a detection result of the sensor unit.

In step S3, the light emission control unit selects one from among the two or more preset light emission patterns, based on a control signal generated by the control signal generation unit, and causes the light-emitting unit to emit light in accordance with the selected light emission pattern. With this, the light emission pattern control process is completed.

As an information processing device to which the present technique is applied, a mobile terminal capable of executing the processes described in this embodiment can be used. In this case, a form in which a user takes the mobile terminal in his or her hand to communicate is preferable.

[Application of the Present Technique to Program]

The above described series of processes can be performed by hardware, and can also be performed by software. When the series of processes are to be performed by software, the programs forming the software are installed into a computer. Here, the computer may be a computer incorporated into special-purpose hardware, or may be a general-purpose personal computer that can execute various kinds of functions as various kinds of programs are installed thereinto.

The programs to be executed by the computer (CPU 31 in FIG. 7) can be recorded in a removable medium not shown as a package medium or the like to be provided, for example. Alternatively, the programs can be provided via a wired or wireless transmission medium such as a local area network, the Internet, or digital satellite broadcasting. As a matter of course, the programs can be provided from the server 11 or another ring 12.

In the computer, the programs, with the removable medium placed into a drive of the server 11, can be received by the wireless module 32 through a wireless transmission medium, and installed in the storage unit 86. Alternatively, the programs can be preinstalled in the storage unit 86.

The programs to be executed by the computer may be programs for performing processes in chronological order in accordance with the sequence described in this specification, or may be programs for performing processes in parallel or performing a process when necessary, such as when there is a call.

It should be noted that embodiments of the present technique are not limited to the above described embodiment, and various modifications may be made to it without departing from the scope of the present technique.

For example, the present technique can be embodied in a cloud computing structure in which one function is shared among apparatuses via a network, and processing is performed by the apparatuses cooperating with one another.

In the above-described example, the information processing device (such as the ring 12) itself performs effect expression such as light emission and vibration, but the way of effect expression is not particularly limited to the above-described example. Specifically, an object to perform effect expression may be an information processing device itself wore by a user as in the above-described example, or may be the other end with which the information processing device communicates, for example, an electric appliance such as a television, a video recorder, a game machine, a light, or an electric shade, or equipment in a facility such as a house, a store, a hall, or a stadium. The kinds of effect expression may be light emission and vibration as in the above-described example, or may be others, for example, an image and sound. When an information processing device is equipped with a soft actuator, a change in the strength of constricting an arm can be used as a kind of effect expression. Further, in this case, any two or more kinds may be combined.

In the above-described state transition diagram in FIG. 6, the states S1 to S7 only show examples, and a different state may be further provided, or at least one of the states S1 to S7 may be omitted. As for the state transition conditions, FIG. 6 only shows examples, and various conditions can be used.

For example, as the state transition condition C1 for a transition from the state S1 to the state S2, when movement caused by wearing the information processing device can be detected, a state transition condition can be set based on the detection result. Likewise, in the information processing device equipped with a temperature sensor, detection of a temperature that can be judged to be a body temperature of a person, for example, 36 degrees can be used as a state transition condition. In the information processing device capable of detecting a heartbeat or a vein, personal authentication is performed based on a detection result of a heartbeat or a vein, and success in the authentication can be used as a state transition condition. As the state transition condition C2 for a transition from the state S2 to the state S1, the opposites of the above-described detection results, for example, detection of stopping of movement or a decrease in temperature can be used as a state transition condition for a transition from the state S2 to the state S1.

As the above-described state transition condition C11, a condition that the proximity distance is within the predetermined range is used, but the state transition condition C11 is not particularly limited to the above-described example. For example, a condition that a predetermined signal is received from the server 11 or another information processing device can be used. Alternatively, an action such as rapid shaking can be used as a condition.

As the state transition conditions for transitions to the states S5, S6, and S7, individually, the signals B1, B2, and B3 from the server 11 are assigned, respectively, but these are not particularly limiting. For example, when an imitative sound of tapping the information processing device once is expressed as "tap," tapping the information processing device three times "tap-tap-tap" may cause a transition of the state of the information processing device to the state S5. Also, for example, shaking twice and then tapping "tap-tap" the information processing device may cause a transition of the state of the information processing device to the state S6. Also, for example, taping twice "tap-tap" and then, after one second, further tapping twice "tap-tap" may cause a transition of the state of the information processing device to the state S7.

As for conditions assigned as the state transition conditions for transitions to other states, in exactly the same way, the conditions in FIG. 8 are illustrated by example, and these are not particularly limiting. For example, as a condition for a state transition from the state S3 to the state S4, a condition that the information processing device is grasped by another hand different from the hand on which the information processing device is wore may be assigned, for example.

Further, a condition assigned as a state transition condition for a transition to one state is not limited to one kind, and may be of more than one kind. For example, as a state transition condition for a transition to the state S5, two different kinds of condition of the signal B1 in FIG. 8 and the above-described tapping three times of the information processing device may be assigned. In this case, when the signal B1 is inputted or the information processing device is tapped three times, the state of the information processing device is changed to the state S5.

When tapping of the information processing device is assigned as a state transition condition, the number of taps and the number of times of shaking are not particularly limited. However, if a too simple operation such as one "tap" is assigned to a state transition condition, unnecessary state transitions can occur, resulting in the possibility of a malfunction of the information processing device. Therefore, it is preferable to assign a somewhat unusual operation to a state transition condition. On the other hand, for the purpose of an intuitive operation, the assignment of a too complicated operation to a state transition condition is unsuitable. Thus, contradictory requests are made to a state transition condition. The above-described operation of a combination of two or more taps satisfies the requests to some extent, and thus is suitable to be assigned to a state transition condition.

In the above-described example, as a state transition condition for a forced return to the idling state S1, a signal of a forced stop of an operation transmitted from the server 11, or an error signal for the case where the signal B3 has a defect or the like is used in the above-described example, but the above-described example is not particularly limiting. For example, also when a stop signal has not been received or generated for a certain period of time or more, a state transition condition is considered to have been satisfied, and a return to the idling state S1 can be made.

The respective steps described with reference to the above described flowchart can be carried out by one apparatus or can be shared among apparatuses.

In a case where more than one process is included in one step, the processes included in the step can be performed by one apparatus or can be shared among apparatuses.

The present technique may also be embodied in the structures described below.

(1)

An information processing device comprising:

a light-emitting unit that emits light in accordance with a light emission pattern specified by a combination of light emission parameters that represent light emission characteristics; and a light emission control unit that performs control to select a light emission pattern from among two or more preset light emission patterns, based on a change in physical quantity resulting from an action of a user, and cause the light-emitting unit to emit light in accordance with the selected light emission pattern.

(2)

The information processing device according to (1), further including a communication control unit that controls wireless communication with another information processing device, wherein the light emission control unit performs control to select a light emission pattern from among the two or more preset light emission patterns, based on the change in physical quantity and a signal received by the communication control unit.

(3)

The information processing device according to (1) or (2), further including: a vibration unit that vibrates in accordance with a vibration pattern specified by a combination of vibration parameters that represent vibration characteristics; and a vibration control unit that performs control to select a light emission pattern from among two or more preset vibration patterns, based on the change in physical quantity, and cause the vibration unit to vibrate in accordance with the selected vibration pattern.

(4)

The information processing device according to any one of (1) to (3), further including a sensor unit that detects a change in physical quantity resulting from an action of a user, wherein the light emission control unit estimates the kind of action taken by the user to communicate with another person, based on a change in physical quantity detected by the sensor unit, and selects a light emission pattern in accordance with the estimated kind of action.

(5)

The information processing device according to any one of (1) to (4), wherein the sensor unit includes an acceleration sensor for detecting a change in acceleration resulting from an action of the user, and the light emission control unit estimates the kind of action taken by the user to communicate with another person, based on a change in acceleration detected by the acceleration sensor, and selects a light emission pattern in accordance with the kind of action.

(6)

The information processing device according to any one of (1) to (5), wherein when the acceleration sensor detects acceleration greater than or equal to a predetermined threshold value, the light emission control unit estimates that the kind of action taken by the user to communicate with another person is a first kind of action of colliding the information processing device, or a second kind of action of continuously shaking the information processing device, and selects a light emission pattern in accordance with the first kind or the second kind estimated.

(7)

The information processing device according to any one of (1) to (6), wherein the light emission control unit, when having estimated the first kind while causing the light-emitting unit to emit light in a first emission color, selects a first light emission pattern specifying a change from the first emission color to a second emission color of the other information processing device and a return to the first emission color over a first period of time.

(8)

The information processing device according to any one of (1) to (7), wherein the light emission control unit, when having estimated the second kind while causing the light-emitting unit to emit light in the first emission color, selects a second light emission pattern specifying a change from the first emission color to the second emission color and a return to the first emission color over a second period of time that is longer than the first period of time.

(9)

The information processing device according to any one of (1) to (8), wherein when the acceleration sensor detects acceleration greater than or equal to the predetermined threshold value, the communication control unit controls wireless communication used for information exchange between another information processing device within a predetermined distance and the information processing device.

(10)

The information processing device according to any one of (1) to (9), wherein the information processing device has a ring-shaped part to be fitted on the user's arm, and the part is provided with a connection for disconnecting or connecting a portion thereof.

(11)

The information processing device according to any one of (1) to (10), wherein the connection has a magnet and a magnet-attracted metal sheet for connecting the portion of the part.

(12)

The information processing device according to any one of (1) to (11), wherein the connection connects the portion of the part by elastic deformation of the material.

The present technique can be applied to information processing devices used as communication tools.

REFERENCE SIGNS LIST 1 information processing system, 11 server, 12 ring, 21 board, 22 connection, 31 CPU, 32 wireless module, 33 three-axis acceleration sensor, 34 LED, 35 vibration mechanism, 81 communication control unit, 82 sensor information acquisition unit, 83 control signal generation unit, 84 light emission control unit, 85 vibration control unit, 86 storage unit

The invention claimed is:

1. An information processing device comprising:
a light-emitting unit that emits light in accordance with a light emission pattern specified by a combination of light emission parameters that represent light emission characteristics; and
a light emission control unit that performs control to select a light emission pattern from among two or more preset light emission patterns, based on a change in physical quantity resulting from an action of a user, and cause the light-emitting unit to emit light in accordance with the selected light emission pattern,
wherein the light emission control unit estimates the action taken by the user to communicate with another person based on the change in the physical quantity, the action being colliding the information processing device with another information processing device and the light emission pattern is selected in accordance with the estimated action,
wherein the light emission pattern specifies a change from a first emission color to a second emission color which has been emitted from the other information processing device and returns to the first emission color over a first period of time.

2. The information processing device according to claim 1, further comprising:
a communication control unit that controls wireless communication with the other information processing device, wherein
the light emission control unit performs control to select the light emission pattern from among the two or more preset light emission patterns, based on the change in physical quantity and a signal received by the communication control unit.

3. The information processing device according to claim 1, further comprising:

a vibration unit that vibrates in accordance with a vibration pattern specified by a combination of vibration parameters that represent vibration characteristics; and a vibration control unit that performs control to select a vibration pattern from among two or more preset vibration patterns, based on the change in physical quantity, and cause the vibration unit to vibrate in accordance with the selected vibration pattern.

4. The information processing device according to claim 1, further comprising:

a sensor unit that detects the change in physical quantity resulting from the action of the user, wherein the light emission control unit estimates the kind of action taken by the user to communicate with the other person, based on the change in physical quantity detected by the sensor unit, and selects the light emission pattern in accordance with the estimated kind of action.

5. The information processing device according to claim 4, wherein the sensor unit includes an acceleration sensor for detecting a change in acceleration resulting from the action of the user, and the light emission control unit estimates the kind of action taken by the user to communicate with the other person, based on the change in acceleration detected by the acceleration sensor, and selects the light emission pattern in accordance with the estimated kind of action.

6. The information processing device according to claim 5, wherein when the acceleration sensor detects an acceleration greater than or equal to a predetermined threshold value, the light emission control unit estimates that the kind of action taken by the user to communicate with the other person is a kind of action of continuously shaking the information processing device, and selects the light emission pattern in accordance with the kind of action estimated.

7. The information processing device according to claim 6, wherein the light emission control unit, when having estimated the kind of action taken by the user while causing the light-emitting unit to emit light in the first emission color, selects another light emission pattern specifying a change from the first emission color to the second emission color and return to the first emission color over a second period of time that is longer than the first period of time.

8. The information processing device according to claim 6, wherein when the acceleration sensor detects the acceleration greater than or equal to the predetermined threshold value, a communication control unit controls wireless communication used for information exchange between the other information processing device within a predetermined distance and the information processing device.

9. The information processing device according to claim 1, wherein the information processing device has a ring-shaped part to be fitted on an arm of the user, and the ring-shaped part is provided with a connection for disconnecting or connecting a portion thereof.

10. The information processing device according to claim 9, wherein the connection has a magnet and a magnet-attracted metal sheet for connecting the portion of the ring-shaped part.

11. The information processing device according to claim 9, wherein the connection connects the portion of the ring-shaped part by elastic deformation of the material of the ring-shaped part.

12. An information processing method for an information processing device having a light-emitting unit that emits light in accordance with a light emission pattern specified by a combination of light emission parameters representing light emission characteristics, the information processing method comprising:

the information processing device emitting light in accordance with a light emission pattern specified by a combination of the light emission parameters; and based on a change in physical quantity resulting from an action of a user, performing control to select a light emission pattern from among two or more preset light emission patterns, and causing the light-emitting unit to emit light in accordance with the selected light emission pattern, wherein the action taken by the user to communicate with another person is estimated based on the change in the physical quantity, the action being colliding the information processing device with another information processing device and the light emission pattern is selected in accordance with the estimated action, wherein the light emission pattern specifies a change from a first emission color to a second emission color which has been emitted from the other information processing device and returns to the first emission color over a first period of time.

13. The information processing device according to claim 1, wherein the light emission control unit performs control to select the light emission pattern from among the two or more preset light emission patterns, based on location information received from the other information processing device within a predetermined distance.

* * * * *